(12) United States Patent
Matsuo et al.

(10) Patent No.: US 8,803,905 B2
(45) Date of Patent: Aug. 12, 2014

(54) DISPLAY CONTROL DEVICE AND DISPLAY LAYER COMBINATION PROGRAM

(75) Inventors: Shigeru Matsuo, Hitachinaka (JP); Tadashi Kamiwaki, Ibaraki (JP); Takashi Nakahara, Hitachi (JP)

(73) Assignee: Clarion Co., Ltd., Saitama-shi (JP)

( * ) Notice: Subject to any disclaimer, the term of this patent is extended or adjusted under 35 U.S.C. 154(b) by 165 days.

(21) Appl. No.: 13/333,206

(22) Filed: Dec. 21, 2011

(65) Prior Publication Data

US 2012/0162243 A1 Jun. 28, 2012

(30) Foreign Application Priority Data

Dec. 22, 2010 (JP) ................................. 2010-285838

(51) Int. Cl.
G09G 5/02 (2006.01)

(52) U.S. Cl.
USPC ........................................................ 345/592

(58) Field of Classification Search
USPC ........................................................ 345/592
See application file for complete search history.

(56) References Cited

U.S. PATENT DOCUMENTS

| | | | |
|---|---|---|---|
| 5,388,204 A | 2/1995 | Ikeda et al. | |
| 6,803,968 B1 | 10/2004 | Numata | |
| 2005/0046729 A1 | 3/2005 | Taguchi et al. | |
| 2005/0152002 A1 | 7/2005 | Shirakawa et al. | |
| 2006/0248030 A1* | 11/2006 | Raynor et al. | 706/20 |
| 2007/0285439 A1 | 12/2007 | King et al. | |

FOREIGN PATENT DOCUMENTS

| | | |
|---|---|---|
| CN | 1592381 A | 3/2005 |
| EP | 1 351 191 A2 | 10/2003 |
| EP | 1 718 065 A1 | 11/2006 |
| JP | 59-168786 A | 9/1984 |
| JP | 5-211601 A | 8/1993 |
| JP | 5-244393 A | 9/1993 |
| JP | 7-28986 A | 1/1995 |
| JP | 11-313339 A | 11/1999 |
| JP | 2000-98993 A | 4/2000 |
| JP | 2000-134576 A | 5/2000 |
| JP | 2000-307956 A | 11/2000 |
| JP | 2004-37632 A | 2/2004 |
| JP | 2004-70221 A | 3/2004 |
| JP | 2008-305030 A | 12/2008 |
| JP | 2009-540371 A | 11/2009 |

OTHER PUBLICATIONS

Japanese Office Action dated Nov. 19, 2013 with English translation (seven (7) pages).
Japanese Information Offer Form with English translation thereof dated Jul. 11, 2013 (Thirteen (13) pages}.
Extended European Search Report dated May 25, 2012 (nine (9) pages).

* cited by examiner

Primary Examiner — David Zarka
Assistant Examiner — Vu Nguyen
(74) Attorney, Agent, or Firm — Crowell & Moring LLP

(57) ABSTRACT

A display control device includes: a transparent color information storage unit that stores transparent color information; a run-length counter that calculates a run-length specifying the number of consecutive pixels having the same color information; a combination calculation unit that combines the image data for the plurality of display layers; and a combined image display unit that outputs the combined image data to a display device. If the color information for a total of run-length pixels calculated by the run-length counter is a transparent color, the combination calculation unit performs combination by ignoring the image data for the total number run-length of consecutive pixels.

3 Claims, 26 Drawing Sheets

FIG.11

IMAGE DATA FOR UPPER LAYER

POINTER RA

| FFFF | FFFF | FFFF | FFFF | 0000 | ... | 0000 |
|------|------|------|------|------|-----|------|
| FFFF | FFFF | FFFF | 0000 | 0000 | ... | 0000 |
| ... | | | | | | |

111

IMAGE DATA FOR LOWER LAYER

POINTER RB

| 2222 | 2222 | 2222 | 2222 | 1111 | ... | 1111 |
|------|------|------|------|------|-----|------|
| ... | | | | | | |

112

FRAME BUFFER

POINTER WC

| ** | ** | ** | ** | ** | ... | ** |
|----|----|----|----|----|----|----|
| ... | | | | | | |

113

COMPRESSED LAYER

POINTER WD

| ** ** | ** ** | ... |
|-------|-------|-----|
| ** ** | ... | |
| ... | | |

114

EXAMPLE OF EXECUTION OF STEP S230

EXAMPLE OF EXECUTION OF STEP S270

FIG.14
EXAMPLE OF EXECUTION OF STEP S290
DATA PAIR THAT WAS INPUTTED
TRANSPARENT COLOR INFORMATION
  IS THE TRANSPARENT COLOR
RUN-LENGTH: "4"
"FFFF" IS NOT THE TRANSPARENT COLOR
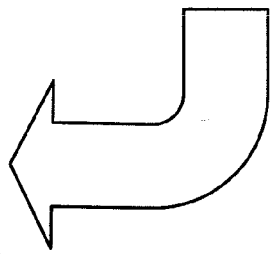
STORE JUST RUN-LENGTH ITEMS OF COLOR INFORMATION "FFFF"
POINTER WC BEFORE STORING    FOUR ITEMS    POINTER WC    113

FIG.15
EXAMPLE OF POINTER POSITIONS AFTER PERFORMING PROCESSING OF STEP S290
IMAGE DATA FOR UPPER LAYER
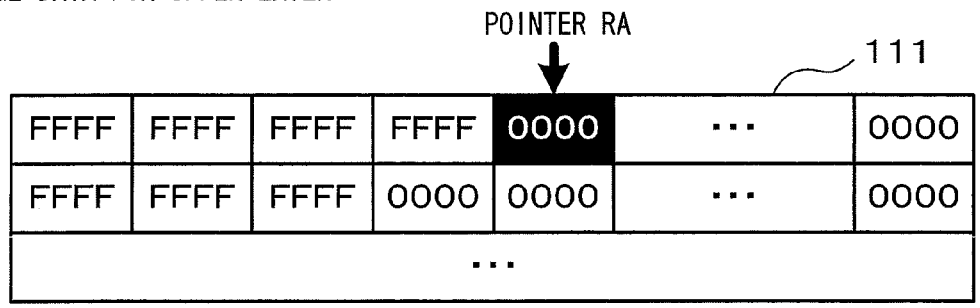
IMAGE DATA FOR LOWER LAYER
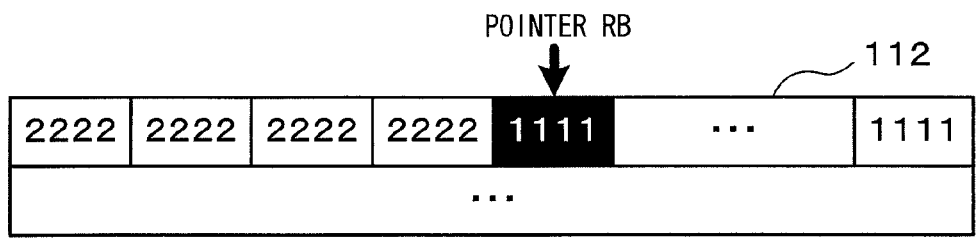
FRAME BUFFER
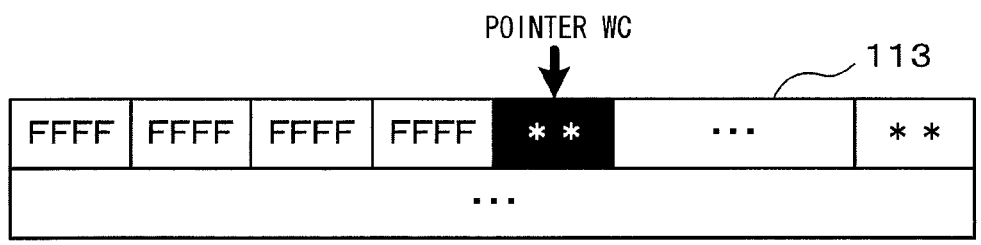

EXAMPLE OF EXECUTION OF STEP S330

POINTER WD

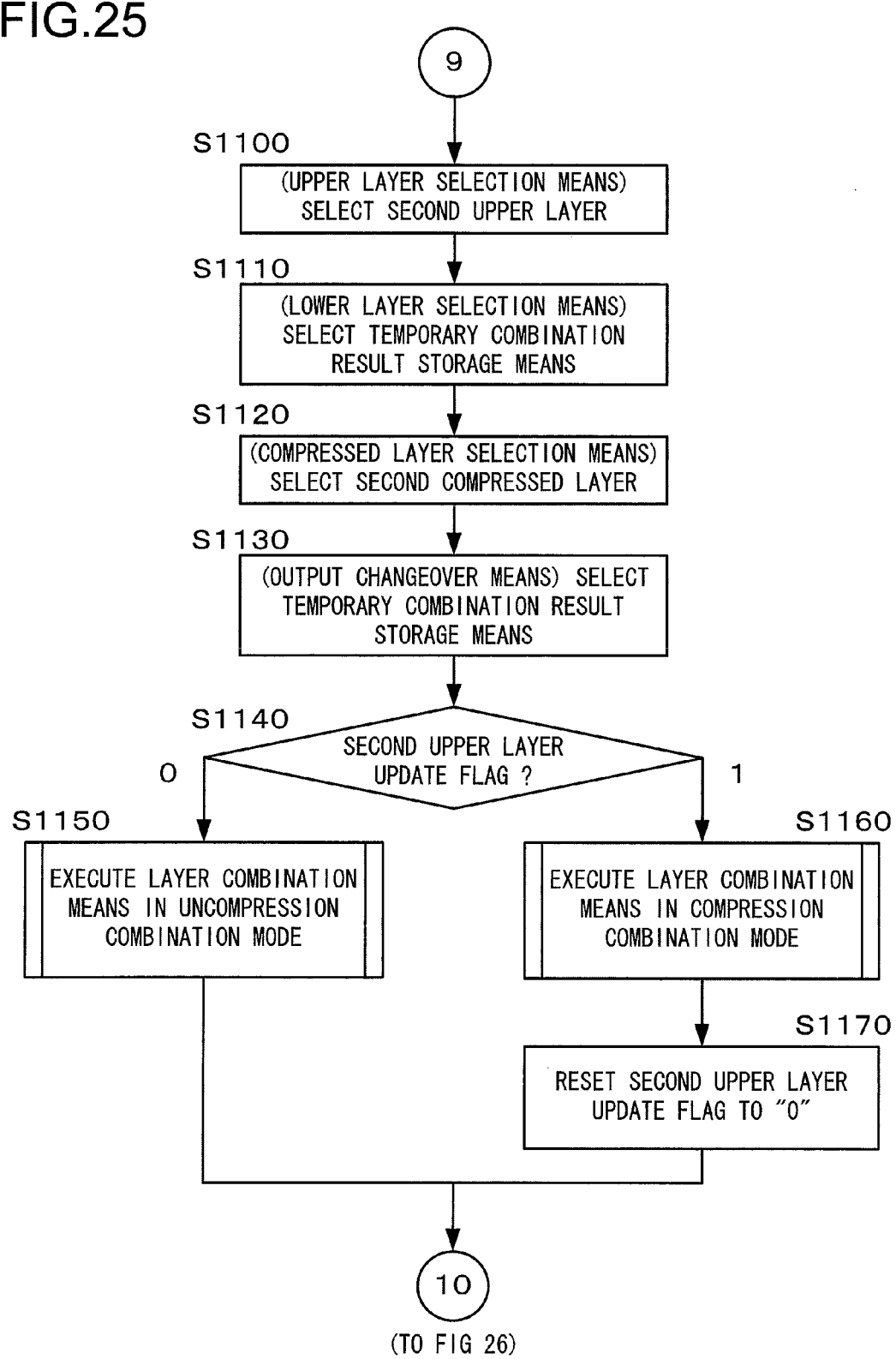

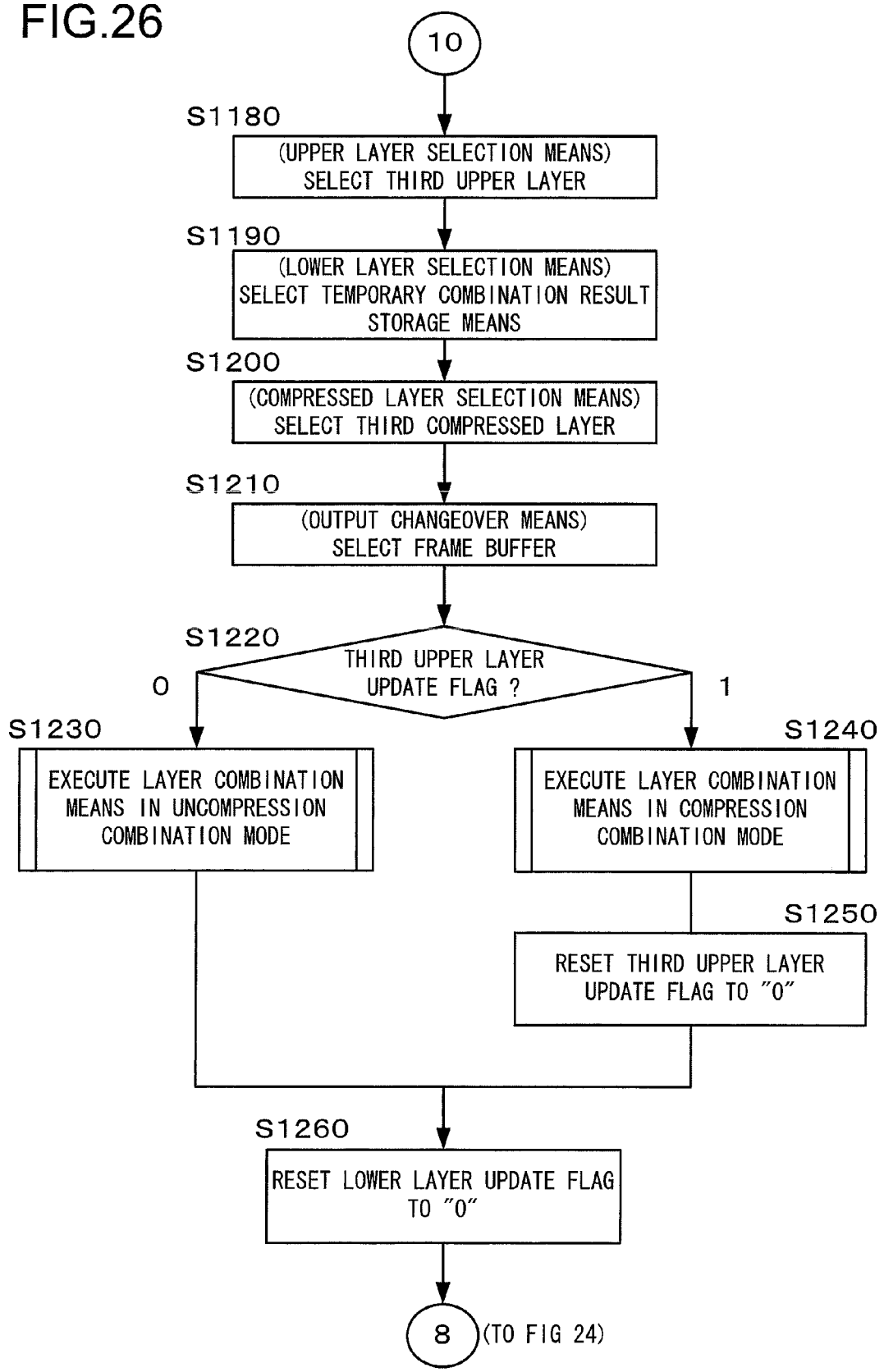

DISPLAY CONTROL DEVICE AND DISPLAY LAYER COMBINATION PROGRAM

INCORPORATION BY REFERENCE

The content of the disclosure of the following application, upon which priority is claimed, is hereby incorporated herein by reference: Japanese Patent Application 2010-285838, filed on 22 Dec. 2010.

BACKGROUND OF THE INVENTION

1. Field of the Invention

The present invention relates to a display control device and to a display layer combination program.

2. Description of Related Art

In Japanese Laid-Open Patent Publication 2008-305030 a combined image generation device is disclosed in which, when a plurality of display layers are to be combined, a decision is made for each pixel as to whether or not the upper display layer is colored as transparent, and superimposition processing is only performed for those pixels that are not colored as transparent.

The object of the present invention is to provide a display control device that implements a combination processing method that can efficiently skip over pixels that are colored as transparent, thus combining a plurality of display layers at high speed.

SUMMARY OF THE INVENTION

A display control device according to a first aspect of the present invention displays, upon a display device, combined image data obtained by combining image data for a plurality of display layers. Each of the plurality of display layers consists of a plurality of pixels, and the image data of each of the plurality of display layers includes color information relating to the colors of the plurality of pixels included in the display layer. The display control device includes: a transparent color information storage unit that stores transparent color information specifying color information for a transparent color in the image data for each of the plurality of display layers, except for the lowermost display layer; a run-length counter that calculates a run-length specifying, for the color information included in the image data for each of the plurality of display layers except for the lowermost display layer, the number of consecutive pixels having the same color information; a combination calculation unit that combines the image data for the plurality of display layers to generate the combined image data; and a combined image display unit that outputs the combined image data generated by the combination calculation unit to the display device to display the combined image upon the display device. If, for some display layer among the plurality of display layers other than the lowermost layer, the color information for a total of run-length pixels calculated by the run-length counter is a transparent color, the combination calculation unit performs combination by ignoring the image data for the total number run-length of consecutive pixels.

According to a second aspect of the present invention, the display control device of the first aspect may further include: an upper layer update decision unit that, for each of the one or more upper layers among the plurality of display layers other than the lowermost display layer, decides whether or not the image data for that upper layer has been updated; a lower layer update decision unit that decides whether or not the image data for the lowermost layer among the plurality of display layers has been updated; a compression unit that generates compressed image data based upon the color information and upon the run-length of that color information calculated by the run-length counter, included in the image data for each of the one or more upper layers, and stores the compressed image data in one or more compressed layers each corresponding to the one or more upper layers; and a decompression unit that reads out, from the compressed image data stored in each of the compressed layers, the color information and the run-length of that color information. In this display control device, it is preferred that the combination calculation unit: generates the combined image data by successively combining the image data for the one or more upper layers with the image data for the lowermost layer, in increasing hierarchical order from the upper layer of lowest order; for each upper layer, among the one or more upper layers, for which it has been decided by the upper layer update decision unit that the image data has been updated, combines the image data for that upper layer with the image data for the lowermost layer on the basis of the run-length calculated by the run-length counter when the compression unit generates the compressed image data for the image data; and, for each upper layer, among the one or more upper layers, for which it has not been decided by the upper layer update decision unit that the image data has been updated, when it has been decided that the image data of the lowermost layer has been updated, combines the image data for that upper layer with the image data for the lowermost layer on the basis of the color information and the run-length read out by the decompression unit from the compressed image data stored in correspondence to that upper layer.

According to a third aspect of the present invention, the display control device of the second aspect may further include an image update frequency decision unit that makes a decision as to whether or not the image data for each of the one or more upper layers is being updated more frequently than a predetermined frame rate. In this display control device, it is preferred that, when it has been decided by the image update frequency decision unit that the image data for any of the one or more upper layers is being updated more frequently than the predetermined frame rate, and moreover when the image data for that upper layer has been updated, the combination calculation unit prohibits the compression unit from storing the compressed image data in the compressed layer corresponding to that upper layer.

A display layer combination program according to a fourth aspect of the present invention is for causing a CPU to combine image data for a plurality of display layers stored in a memory. In this program, it is preferred that: each of the plurality of display layers consists of a plurality of pixels; the image data for each of the plurality of display layers includes color information relating to the colors of the plurality of pixels included in that display layer; and transparent color information specifying color information for a transparent color in the image data for each of the plurality of display layers, except for the lowermost display layer, is stored in the memory. The program may cause the CPU to function as: a run-length calculation unit that calculates a run-length specifying, for the color information included in the image data for each of the plurality of display layers except for the lowermost display layer, the number of consecutive pixels having the same color information; and a combination calculation unit that combines the image data for the plurality of display layers by units of pixels to generate the combined image data. If for some display layer among the plurality of display layers other than the lowermost layer, the color information for a total of run-length pixels calculated by the run-length counter is a transparent color, the combination calculation unit performs combination by ignoring the image data for the total number run-length of consecutive pixels.

According to a fifth aspect of the present invention, in the display layer combination program of the fourth aspect, the program may further cause the CPU to function as: an upper layer update decision unit that, for each of the one or more upper layers among the plurality of display layers other than the lowermost display layer, decides whether or not the image data for that upper layer has been updated; a lower layer update decision unit that decides whether or not the image data for the lowermost layer among the plurality of display layers has been updated; a compression unit that generates compressed image data based upon color information and the run-length of that color information calculated by the run-length counter, included in the image data for each of the one or more upper layers, and stores the compressed image data in one or more compressed layers each corresponding to the one or more upper layers; and a decompression unit that reads out, from the compressed image data stored in each of the compressed layers, the color information and the run-length of that color information. In this program, it is preferred that the combination calculation unit: generates the combined image data by successively combining the image data for the one or more upper layers with the image data for the lowermost layer, in increasing hierarchical order from the upper layer of lowest order; for each upper layer, among the one or more upper layers, for which it has been decided by the upper layer update decision unit that the image data has been updated, combines the image data for that upper layer with the image data for the lowermost layer on the basis of the run-length calculated by the run-length counter when the compression unit generates the compressed image data for the image data; and for each upper layer, among the one or more upper layers, for which it has not been decided by the upper layer update decision unit that the image data has been updated, when it has been decided that the image data of the lowermost layer has been updated, combines the image data for that upper layer with the image data for the lowermost layer on the basis of the color information and the run-length read out by the decompression unit from the compressed image data stored in correspondence to that upper layer.

With the display control device of the present invention, it is possible efficiently to skip over pixels that are colored as transparent, thus combining a plurality of display layers at high speed.

BRIEF DESCRIPTION OF THE DRAWINGS

FIG. 11 is a figure for explanation of processing by the layer combination means in the compression combination mode;

FIG. 14 is a further figure for explanation of processing by the layer combination means in the compression combination mode;

FIG. 15 is a further figure for explanation of processing by the layer combination means in the compression combination mode;

FIG. 25 is a further example of a flow chart related to combination processing for combining three or more display layers; and FIG. 26 is a further example of a flow chart related to combination processing for combining three or more display layers.

DESCRIPTION OF THE PREFERRED EMBODIMENTS

The display control device according to the present invention can be applied to a navigation device or the like. In the following, as one example of implementation, a case in which the present invention is applied to a navigation device will be explained with reference to the drawings.

Figure 1:
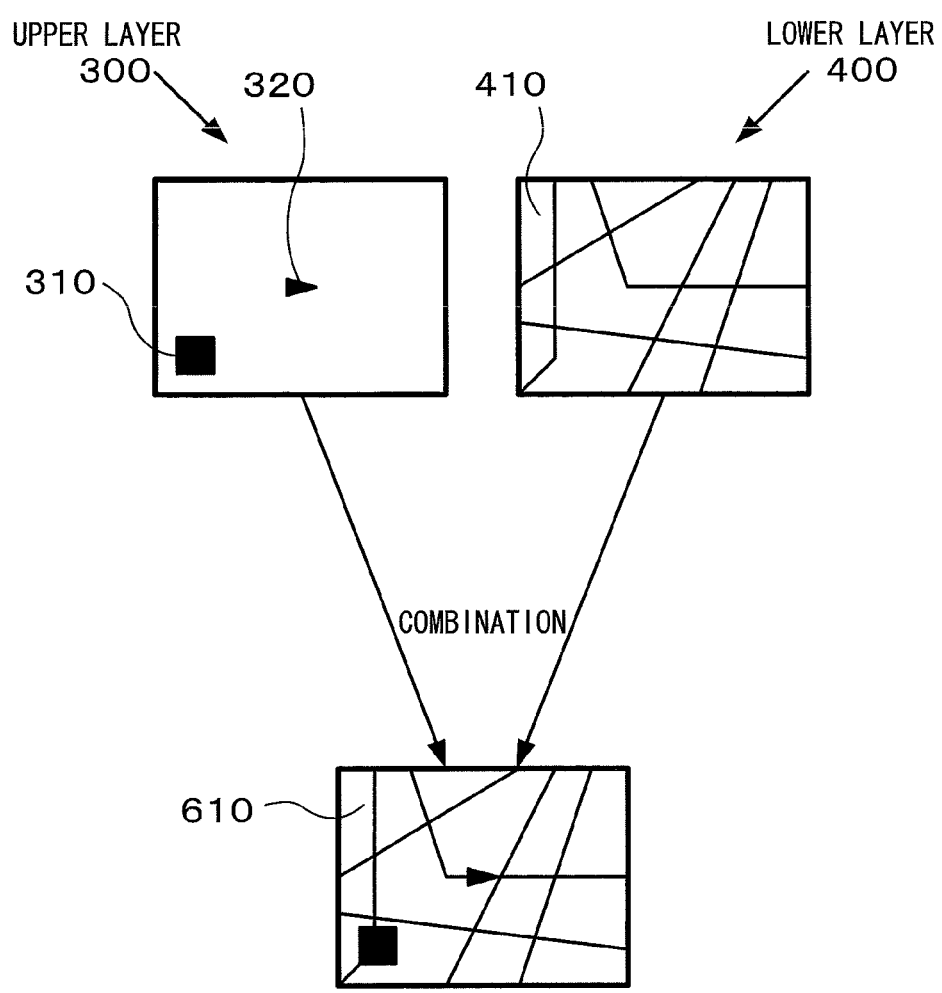
FIG. 1 is a figure for explanation of combination processing for combining images on several display layers, executed by a navigation device that is an embodiment of the display control device according to the present invention.

FIG. 1 is a schematic figure for explanation of processing performed by the navigation device for combining images on two display layers. In FIG. 1, as an example of a plurality of display layers to be combined during the operation of the navigation device, an upper layer 300 and a lower layer 400 are shown. As an example of an image drawn in the lower layer 400, a surroundings map 410 of the area surrounding the position of the subject vehicle to which this navigation device is mounted is shown. And, as an example of an image drawn in the upper layer 300, an image that is to be overlaid upon the surroundings map 410 drawn in the lower layer 400 is shown, containing a map mark 310 that indicates the scale of the surroundings map 410 and its orientation and so on, and a subject vehicle position mark 320 that indicates the position of the subject vehicle and so on. The image drawn in the upper layer 300 is superimposed by the navigation device upon the image drawn in the lower layer 400, so as to obtain a combined image 610. When the image drawn in the upper layer 300 or the image drawn in the lower layer 400 is updated along with shifting of the vehicle to which this navigation device is mounted, then the combined image 610 is also updated. The explanation in the following will use, as an example, a case in which processing is executed by the navigation device to combine the image in the upper layer 300 and the image in the lower layer 400 in order to obtain the combined image 610, in order to abbreviate the explanation.

Figure 2:
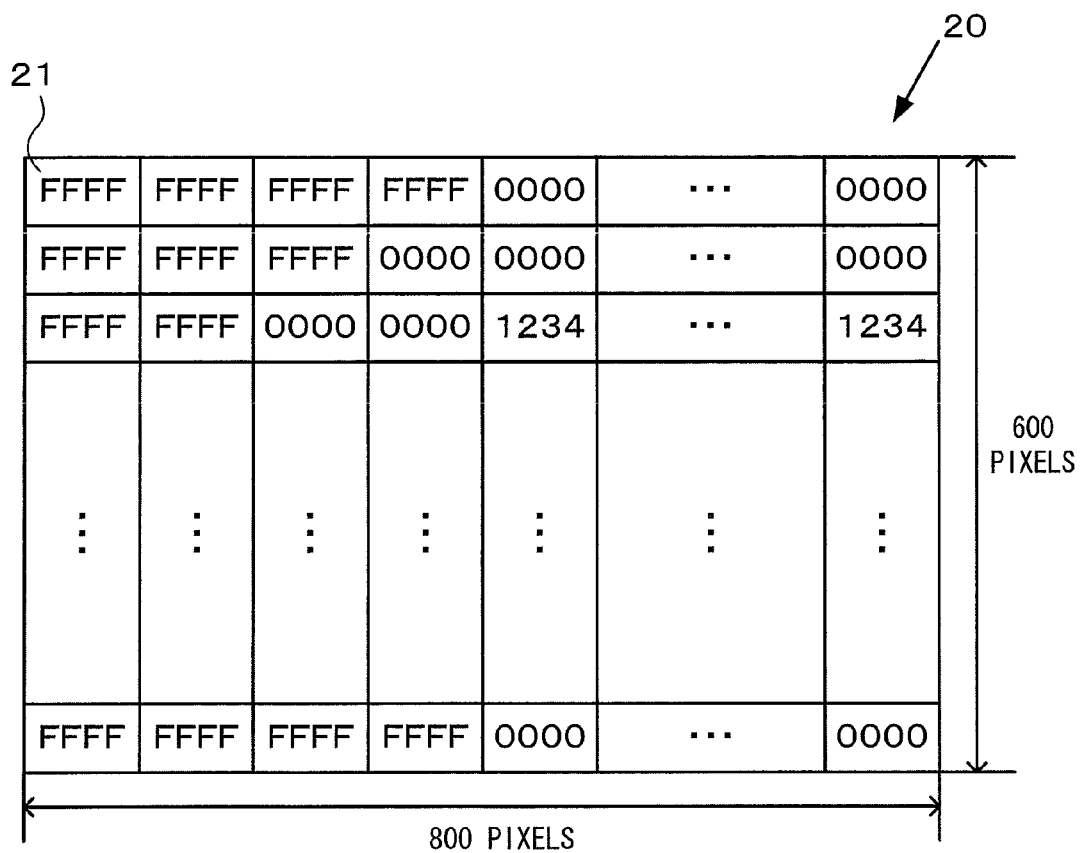
FIG. 2 is a figure for explanation of image data stored in the display layers.

Each of the image in the upper layer 300, the image in the lower layer 400, and the combined image 610 in FIG. 1 is stored by the navigation device in the state of being divided into a plurality of pixels. In the image data of each image there is held color information that specifies, for each pixel, the color tone and the gradation and so on for the color of that pixel. An example of such image data is shown in FIG. 2. Color information such as "FFFF" and "0000" and so on is held in sequence in the image data 20 shown in FIG. 2. In the following, it will be supposed that the image data for the image in the upper layer 300, the image data for the image in the lower layer 400, and the image data for the combined image 610 of FIG. 1 is held in a data format like that of this image data 20. And, for the sake of brevity, the explanation will assume that the data for each of those images consists of 800 pixels of data horizontally by 600 pixels of data vertically. This should not be taken as implying that the present invention can only be applied to image data in this format of 800 pixels horizontally by 600 pixels vertically.

With a display control device that draws an image that is separated into a plurality of display layers like the image in FIG. 1, there is the problem that, when combining the images on the plurality of display layers using software, the time period required for processing is long. One cause for the processing time period related to combination of the images to become long is that, in some cases, the data for all the pixels in all the display layers is read out, irrespective of whether or not the pixel in the upper layer 300 is transparent in color. Since a pixel that is transparent in color is treated as being transparent during combination of the images, it would be possible to combine the images at higher speed if it were possible efficiently to skip over the pixels of transparent color that are not needed to be read out for combination of the image data. In this embodiment, it is arranged to increase the speed of processing for combining the images in the plurality of display layers by skipping over all the pixels of transparent color together.

Figure 3:
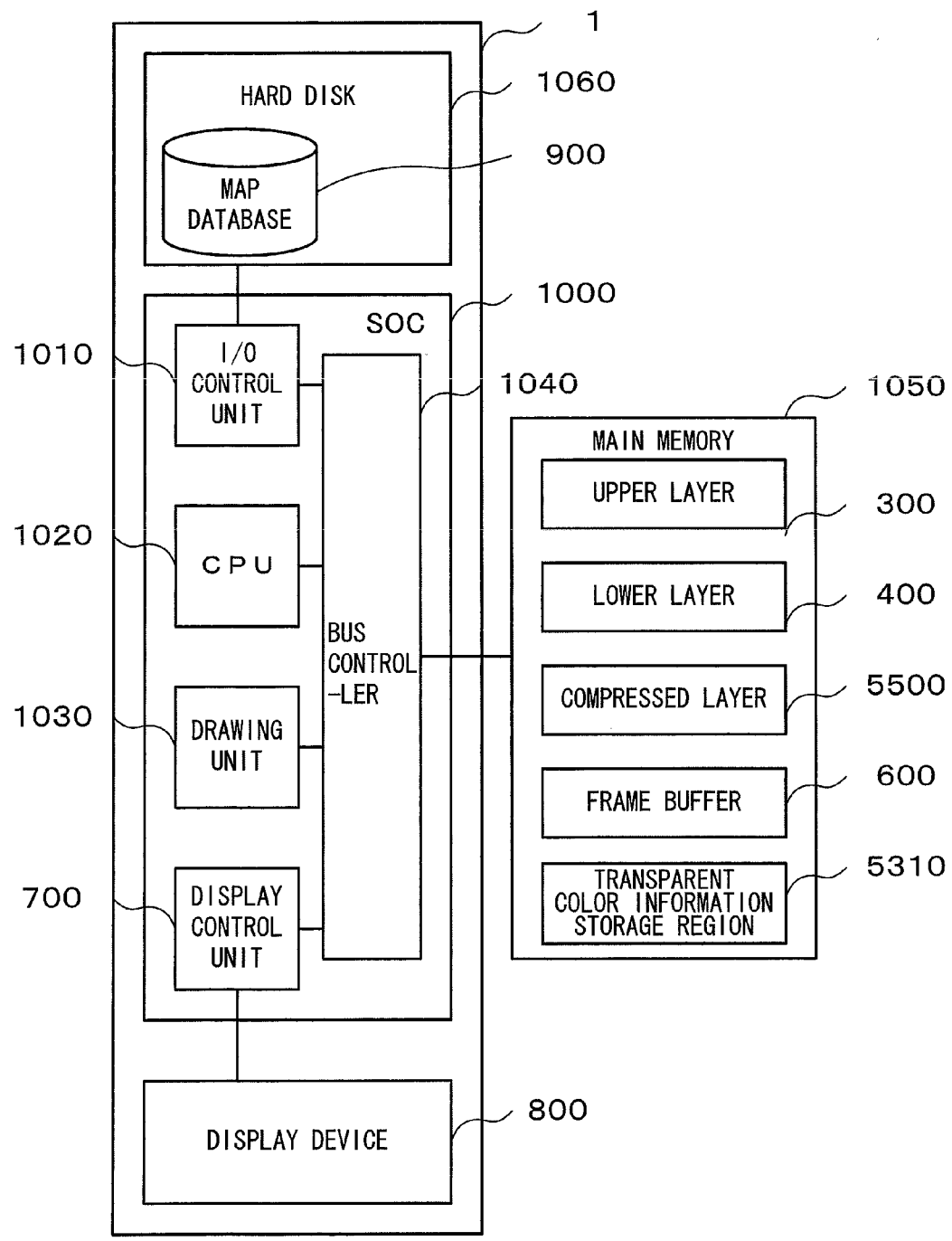
FIG. 3 is an example of a block diagram showing the structure of a navigation device that is an embodiment of the display control device according to the present invention.

FIG. 3 is a block diagram showing an example of a hardware structure for this navigation device that performs combination of images on different display layers. In FIG. 3, the navigation device 1 includes a SOC (System On Chip) 1000, a hard disk 1060, a display device 800, and a main memory 1050. And the SOC 1000 includes an I/O (Input/Output) control unit 1010, a CPU (Central Processing Unit) 1020, a drawing unit 1030, a display control unit 700, and a bus controller 1040.

The SOC 1000 is connected to the main memory 1050, the hard disk 1060, and the display device 800. In the interior of the SOC 1000, the CPU 1020, the drawing unit 1030, the display control unit 700, and the I/O control unit 1010 are connected to a memory bus that is controlled by the bus controller 1040. In FIG. 3, the fact that the structural elements of the SOC 1000 are connected to the memory bus is illustrated by them both being connected to the bus controller 1040. The SOC 1000 is connected to the main memory 1050 via the memory bus (i.e. via the bus controller 1040). Moreover, the SOC 1000 is connected to the hard disk 1060 via the I/O control unit 1010. And the SOC 1000 is connected to the display device 800 via the display control unit 700.

On the basis of control by the CPU 1020, the I/O control unit 1010 of the SOC 1000 accesses peripheral devices such as the hard disk 1060 and so on. A map database 900 in which map data for drawing the surroundings map 410 and so on, and image data for images of various types, such as the map mark 310 and the subject vehicle position mark 320 and so on, are stored in the hard disk 1060 that is accessed by the I/O control unit 1010. The CPU 1020 is able to control the I/O control unit 1010 to access the hard disk 1060, and is thereby able to read out map data and image data of various types from the hard disk 1060.

On the basis of control by the CPU 1020, the drawing unit 1030 of the SOC 1000 draws images of various types such as the map mark 310, the subject vehicle position mark 320, the surroundings map 410 and so on in display layers such as the upper layer 300 and the lower layer 400 and so on. For example, when drawing the lower layer 400, first the CPU 1020 determines the map range at which the surroundings map 410 should be drawn on the lower layer 400, and then the CPU 1020 accesses the hard disk 1060 via the I/O control unit 1010, and reads out the map data for this map range from the map database 900. And the CPU 1020 controls the drawing unit 1030 and draws an image of the surroundings map 410 on the basis of the map data that has been read out from the map database 900. The same action is performed for the upper layer 300 as well: the CPU 1020 accesses the hard disk 1060 via the I/O control unit 1010, and reads out image data related to the map mark 310 and to the subject vehicle position mark 320. And, with the drawing unit 1030, the CPU 1020 draws an image on the upper layer 300 based upon this image data related to the map mark 310 and to the subject vehicle position mark 320 that has been acquired from the hard disk 1060.

The main memory 1050 is a RAM (Random Access Memory), and is a working region for processing of various types executed by the SOC 1000. The upper layer 300, the lower layer 400, a compressed layer 5500, a frame buffer 600, and a transparent color information storage region 5310 are provided in the main memory 1050, and serve as storage regions in which data required for combining the display layers is temporarily stored. The frame buffer 600 is a storage region for storing image data to be outputted to the display device 800. The combined image data for the combined image 610 that is obtained by combining the image in the upper layer 300 and the image in the lower layer 400 is stored in this frame buffer 600. The compressed layer 5500 is a storage region that is used for storing compressed image data that has been obtained by compressing the image data for the upper layer 300. And the transparent color information storage region 5310 is a storage region that is used for storing transparent color information that specifies which color in the image in the upper layer 300 is to be handled as being the transparent color.

The image data, the combined image data, the compressed image data, and so on are stored in the main memory 1050 using a data structure such as, for example, a linked list structure or the like. The contents of this data can be read and written via pointer variables or the like used by software executed by the CPU 1020.

On the basis of control by the CPU 1020, the display control unit 700 of the SOC 1000 reads out image data from the frame buffer 600 and transmits it to the display device 800. Thus, the combined image data for the combined image 610 is transmitted by the display control unit 700 to the display device 800. The display device 800 is a liquid crystal monitor or the like, and performs output and display based upon the image data transmitted from the display control unit 700. Thus, when the combined image data is transmitted via the display control unit 700, the display device 800 displays the combined image 610.

Figure 4:
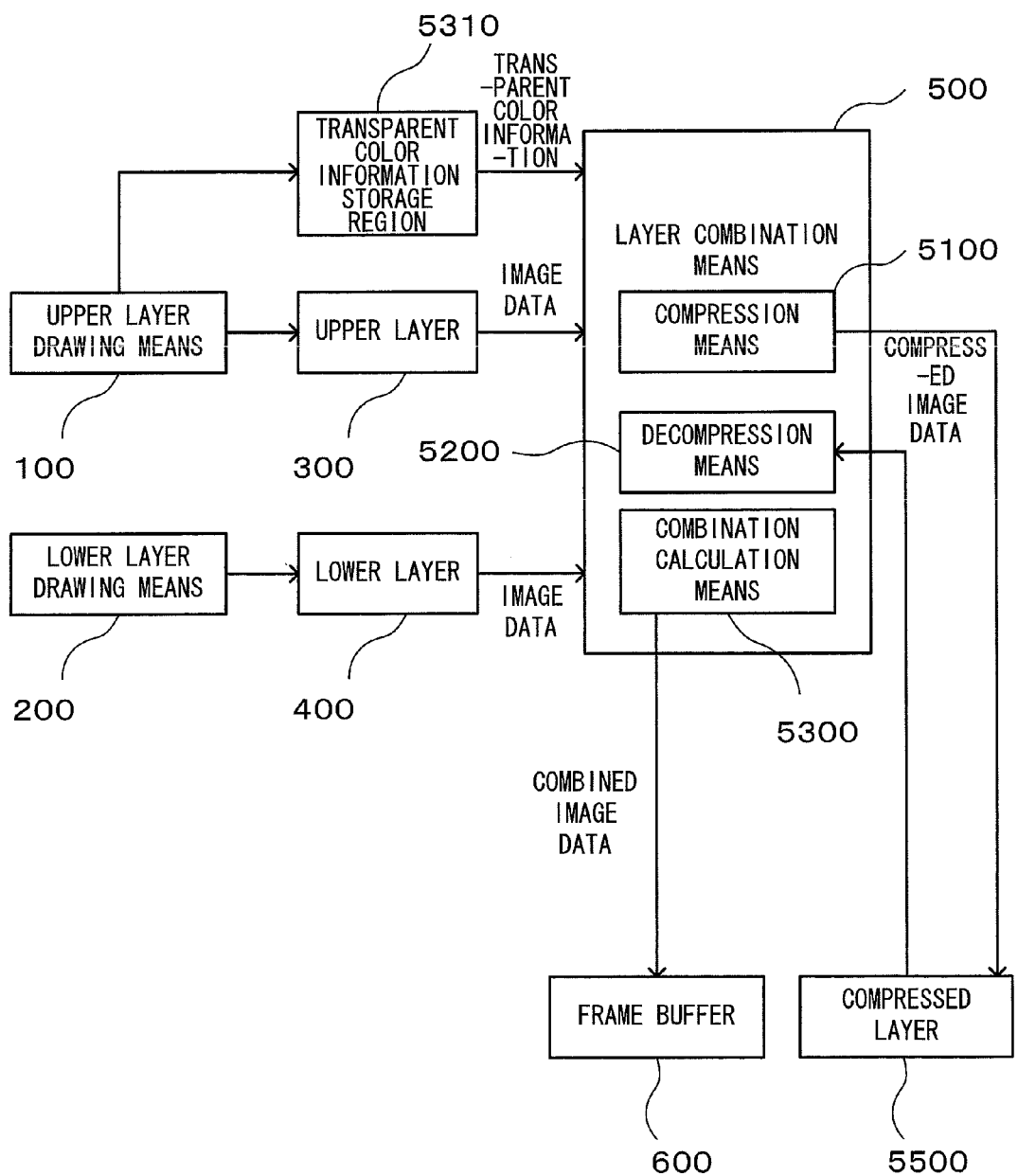
FIG. 4 is an example of a functional structural diagram of a display control device related to combination processing.

FIG. 4 is a functional structural diagram of the navigation device 1 related to combination processing for combining the upper layer image 300 and the lower layer image 400 in order to obtain the combined image 610. The functional diagram of FIG. 4 includes an upper layer drawing means 100, a lower layer drawing means 200, the upper layer 300, the lower layer 400, a layer combination means 500, and the frame buffer 600. Among these, the upper layer drawing means 100, the lower layer drawing means 200, and the layer combination means 500 are implemented by software executed by the CPU 1020.

For implementing the upper layer drawing means 100, the CPU 1020 controls the drawing unit 1030 and creates image data for the upper layer 300 based upon the image data for the map mark 310 and the subject vehicle position mark 320 and so on, and stores this data in the upper layer 300 of the main memory 1050. Moreover, the upper layer drawing means 100 creates transparent color information, which is information related to the color in the upper layer 300 that is considered to be transparent, and stores this information in the transparent color information storage region 5310 of the main memory 1050. The color that is taken as being a transparent color in the transparent color information is treated as being transparent. When the image in the upper layer 300 is overlaid over the image in the lower layer 400, the lower layer 400 shows through and is visible at the positions of those pixels, among the pixels in the upper layer 300, that have color information for the color that is taken as being the transparent color.

For implementing the lower layer drawing means 200, the CPU 1020 controls the drawing unit 1030 and creates image data for the surroundings map 410, and stores this data in the lower layer 400 of the main memory 1050.

The layer combination means 500 is executed under control by the CPU 1020, and includes three subroutines: a compression means 5100, a decompression means 5200, and a combination calculation means 5300.

The compression means 5100 compresses image data that has been inputted according to the per se known run-length method, and stores the compressed image data that is the result of this compression in the compressed layer 5500 of the main memory 1050. And the decompression means 5200 reads in compressed image data stored in the compressed layer 5500, and recreates the original image data.

The combination calculation means 5300 overlays together, pixel by pixel, the image data for a plurality of display layers that have been inputted on the basis of the transparent color information and thereby generates combined image data and stores this data in the frame buffer 600.

And, according to control by the CPU 1020, the layer combination means 500 executes these three subroutines as appropriate, and thereby generates combined image data for the combined image 610 in which the image data for the upper layer 300 and the image data for the lower layer 400 are combined, and stores this data in the frame buffer 600.

Figure 5:
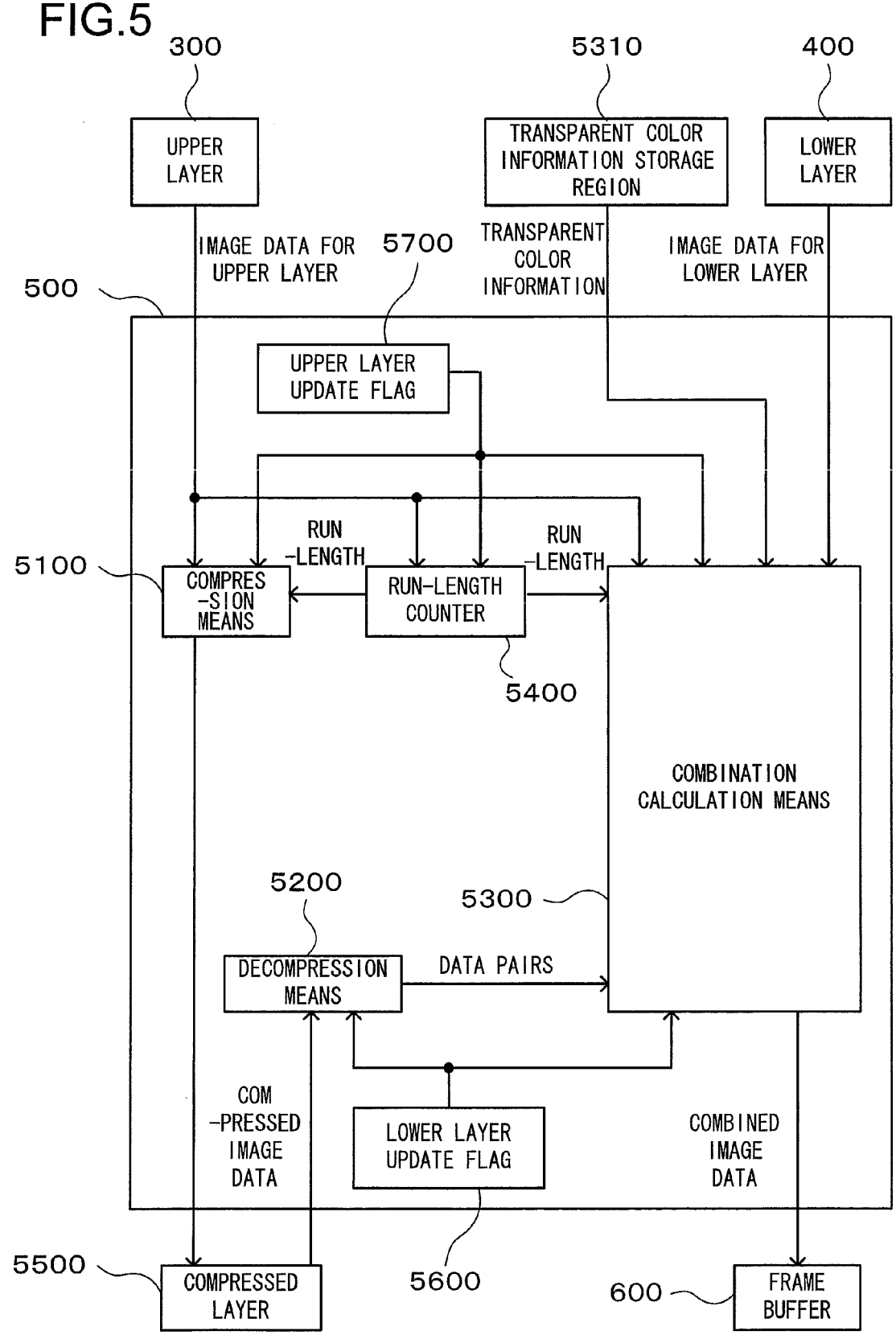
FIG. 5 is an example of a functional block diagram of a layer combination means.

A functional block diagram that specifies the function of the layer combination means 500 in more detail is shown in FIG. 5. The layer combination means of FIG. 5 includes a compression means 5100, a decompression means 5200, a combination calculation means 5300, a run-length counter 5400, a lower layer update flag 5600, and an upper layer update flag 5700.

The run-length counter 5400 is used when the compression means 5100 compresses image data according to the per se known run-length method, and calculates the number of successive pixels in the image data for the upper layer 300 that have the same color information. In the following the number of successive pixels that have the same color information, as calculated by the run-length counter 5400, will be termed the "run-length".

The operation of the run-length counter 5400 will now be explained with reference to the example of image data 20 shown in FIG. 2. At the start of the uppermost row of the image data 20 of FIG. 2, there are four successive pixels that have the color information "FFFF". The run-length counter 5400 counts for how many pixels the color information "FFFF" continues, and thereby calculates a run-length of "4" for the successive color information "FFFF". In the image data 20, after these four successive pixels having color information "FFFF", successive pixels with color information "0000" continue to the end of the row. Thus, the run-length counter 5400 counts the number of successive pixels having color information "0000" to the end of the row, and thereby calculates a run-length of "796" for the successive color information "0000".

In cooperation with the run-length counter 5400, the compression means 5100 compresses the image data for the upper layer 300 by the per se known run-length method, and stores the resulting compressed image data for the upper layer 300 in the compressed layer 5500. This compressed image data stored by the compression means 5100 is stored as data pairs, each consisting of the color information of a pixel of image data in the upper layer 300, paired with the run-length of the succession of pixels having this color information. The decompression means 5200 reads out these data pairs from the compressed layer 5500.

Figure 6:
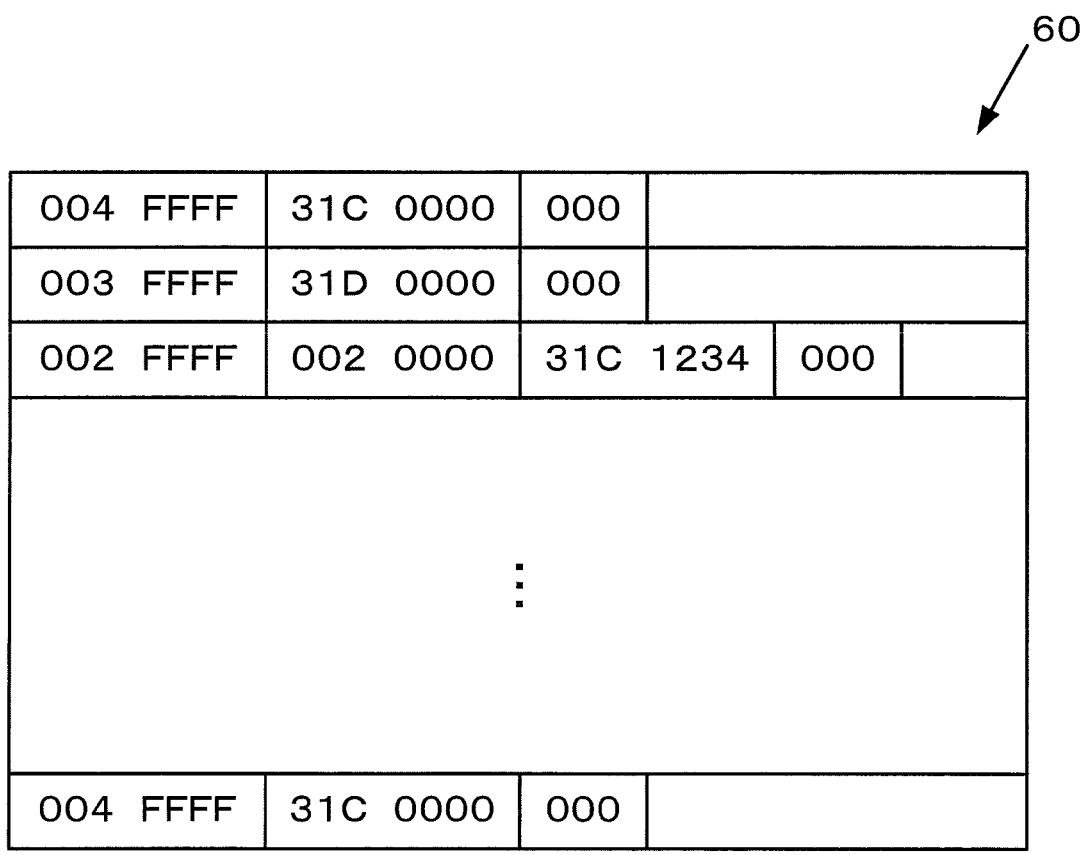
FIG. 6 is a figure for showing an example of a result of compressing image data according to a run-length method.

The result of compression of the image data 20 of FIG. 2 is shown in FIG. 6 as an example of processing by the compression means 5100. Thus, the compressed image data 60 shown in FIG. 6 is the result of compression by the compression means 5100 of the image data 20 of FIG. 2. In the first row of the compressed image data 60 shown in FIG. 6, the data obtained by compressing the first row of the image data 20 of FIG. 2 is shown. As previously described, in this first row of the image data 20, after four successive pixels that have the color information "FFFF", there follow 796 successive pixels having the color information "0000". Due to this, in the first row of the compressed image data 60, a data pair "004 FFFF" is stored, in which the first color information "FFFF" and the run-length "004" (expressed in hexadecimal) corresponding to that color information are paired together. And, after this data pair "004 FFFF", a data pair "31C 0000" is stored, in which the color information "0000" and the run-length "31C" (expressed in hexadecimal) corresponding to that color information are paired together. The same holds for the second and subsequent rows of the compressed image data 60 shown in FIG. 6. It should be understood that the end symbol "000" is appended at the tail end of each row of the compressed image data 60.

The explanation now returns to FIG. 5. The layer combination means 500 is endowed with two processing modes. In the first of these processing modes, the layer combination means 500 executes the run-length counter 5400, the compression means 5100, and the combination calculation means 5300. In the following, this processing mode will be termed the "compression combination mode".

In this compression combination mode, when updating the upper layer 300, the compression means 5100 compresses the image data for the updated upper layer 300, and stores the compressed image data that has been thus obtained in the compressed layer 5500. And the combination calculation means 5300 generates combined image data for the combined image 610, one pixel at a time, on the basis of the image data and the transparent color information for the upper layer 300 and the image data for the lower layer 400, and stores this combined image data in the frame buffer 600.

In the second processing mode by the layer combination means 500, the layer combination means 500 executes the decompression means 5200 and the combination calculation means 5300. In the following, this processing mode will be termed the "uncompression combination mode".

In this uncompression combination mode, the decompression means 5200 reads in data pairs from the compressed image data for the upper layer 300 that are stored in the compressed layer 5500. As these data pairs are read in by the decompression means 5200, the layer combination means 500 inputs them to the combination calculation means 5300. And the combination calculation means 5300 generates combined image data for the combined image 610, one pixel at a time, on the basis of the data pairs read in by the decompression means 5200, the transparent color information for the upper layer 300, and the image data for the lower layer 400, and stores this combined image data in the frame buffer 600.

The processing mode for the layer combination means 500 is selected on the basis of an upper layer update flag 5700 and a lower layer update flag 5600. The upper layer update flag 5700 is a flag that specifies whether or not the image data for the upper layer 300 has been updated. And the lower layer update flag 5600 is a flag that specifies whether or not the image data for the lower layer 400 has been updated. It should be understood that, in the following, it will be supposed that all of the flags have either the value "0" or "1", and that they are stored in the main memory 1050.

If the upper layer update flag 5700 is set to "1", then, irrespective of the value of the lower layer update flag 5600, the layer combination means 500 operates in the compression combination mode. On the other hand, when the upper layer update flag is reset to "0", then the layer combination means 500 operates in the uncompression combination mode if the lower layer update flag 5600 is set to "1".

The upper layer update flag 5700 is controlled by the CPU 1020. When the upper layer drawing means 100 proceeds to store image data in the upper layer 300 that is different from the image data that is already stored in the upper layer 300, then the CPU 1020 sets the value of the upper layer update flag 5700 to "1".

The lower layer update flag 5600 is also controlled by the CPU 1020, in a similar manner to the upper layer update flag 5700. When the lower layer drawing means 200 proceeds to store image data in the lower layer 400 that is different from the image data that is already stored in the lower layer 400, then the CPU 1020 sets the value of the lower layer update flag 5600 to "1".

The processing that is performed by the layer combination means 500 during these processing modes will now be explained. During the compression combination mode, the layer combination means 500 inputs and acquires the image data and the transparent color information for the upper layer 300, and the image data for the lower layer 400. The image data for the upper layer 300 is inputted to the compression means 5100, to the combination calculation means 5300, and to the run-length counter 5400. And the transparent color information for the upper layer 300 and the image data for the lower layer 400 are inputted to the combination calculation means 5300.

During the compression combination mode, each time a run-length for the image data for the upper layer 300 is confirmed by the run-length counter 5400 in cooperation with the compression means 5100, the layer combination means 500 stores the data pair relating to this confirmed run-length in the compressed layer 5500, and also outputs this data pair to the combination calculation means 5300. And the combination calculation means 5300 refers to the transparent color information for the upper layer 300, and makes a decision as to whether or not the color specified by the color information included in the data pair that has been outputted is the transparent color. And, if the color information included in this data pair is the transparent color, then the amount of image data for the upper layer 300 specified by the run-length that is included in this data pair is skipped over, the image data for the upper layer 300 that has been skipped over is ignored, and combined image data is generated on the basis of the image data for the lower layer 400. On the other hand, if the color specified by the color information included in this data pair is not the transparent color, then the image data for the upper layer 300 is not ignored.

Figure 7A:
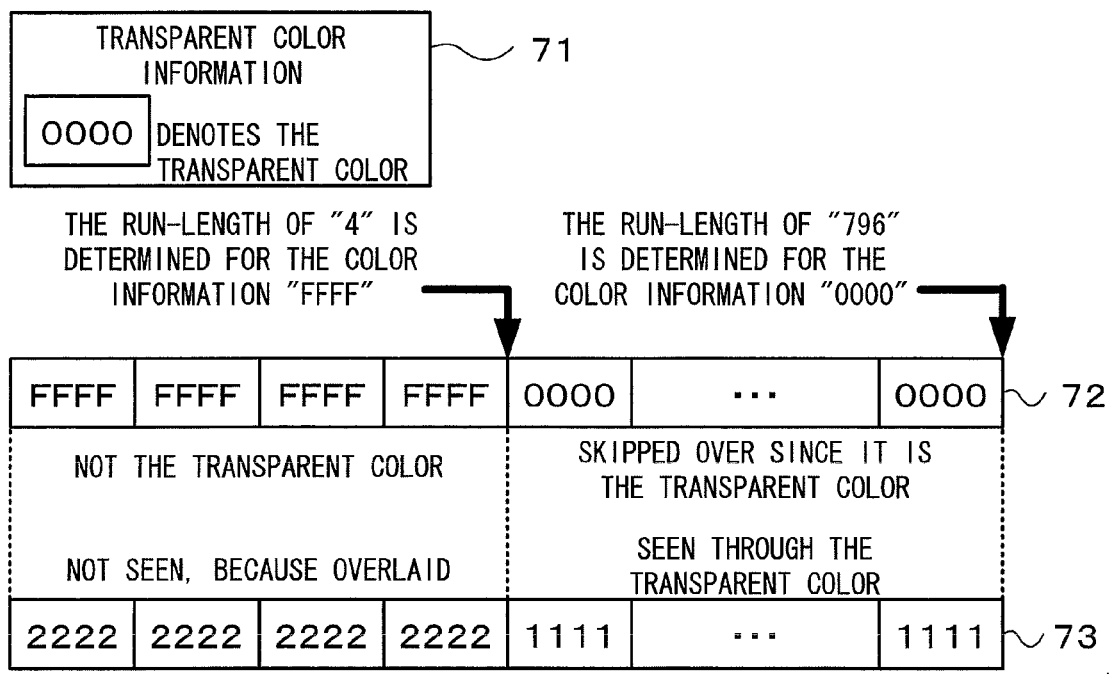
FIGS. 7A and 7B are figures for explanation of processing for combining an upper layer and a lower layer.
Figure 7B:
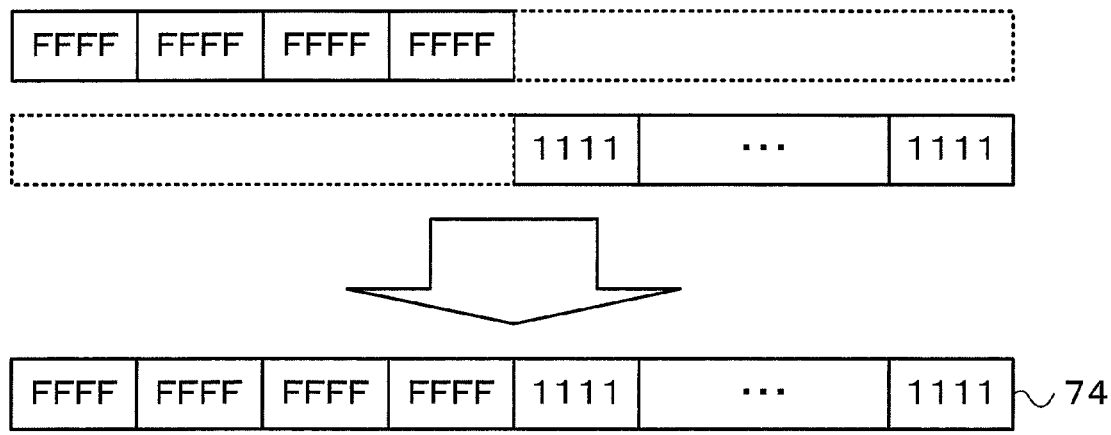

The behavior of the layer combination means 500 in the compression combination mode will now be explained with reference to FIGS. 7A and 7B. Transparent color information 71 and image data 72 are shown in FIG. 7A as one example of information related to the upper layer 300. The color information "0000" is set in the transparent color information 71 as being the transparent color. Moreover, in FIG. 7A, image data 73 is shown as one example of information related to the lower layer 400. And the combined image data 74 that results from combination of the image data 72 and the image data 73 is shown in FIG. 7B.

When the compression means 5100 starts the processing of the image data 72, first the run-length counter 5400 starts calculation of the run-length for the color information "FFFF". When the run-length counter 5400 calculates a run-length of "4" for the color information "FFFF", the layer combination means 500 inputs the data pair "004 FFFF" to the combination calculation means 5300. Upon receipt of this data pair "004 FFFF", the combination calculation means 5300 makes a decision as to whether or not the color information "FFFF" is the transparent color, on the basis of the transparent color information 71. And, since the color information "FFFF" is not the transparent color, accordingly the combination calculation means 5300 stores just "4" values in the frame buffer 600 consisting of the color information "FFFF" from the image data 72 of the upper layer 300. Next, the run-length counter 5400 starts calculation of the run-length for the color information "0000". When the run-length counter 5400 calculates a run-length of "796" for the color information "0000", the layer combination means 500 inputs the data pair "31C 0000" to the combination calculation means 5300. Upon receipt of this data pair "31C FFFF", the combination calculation means 5300 makes a decision as to whether or not the color information "0000" is the transparent color, on the basis of the transparent color information 71. And, since the color information "0000" is the transparent color, accordingly the combination calculation means 5300 ignores the portion in the image data 72 consisting of the color information "0000", and stores just "796" values in the frame buffer 600 consisting of the color information "1111" from the image data 73 of the lower layer 400. The result of the above is that combined image data 74 including "4" values consisting of the color information "FFFF" and "796" values consisting of the color information "1111" is stored in the frame buffer 600.

Next, the processing in the uncompression combination mode will be explained. During the uncompression combination mode, the layer combination means 500 acquires the transparent color information for the upper layer 300, the image data for the lower layer 400, and the compressed image data in the compressed layer 5500 as input. The compressed image data in the compressed layer 5500 is inputted to the decompression means 5200. And the data pairs in the compressed image data that has been read in by the decompression means 5200, the transparent color information for the upper layer 300, and the image data for the lower layer 400 are inputted to the combination calculation means 5300.

First, in the uncompression combination mode, the layer combination means 500 starts processing by the decompression means 5200. And, each time a data pair is read in by the decompression means 5200 from the compressed image data that is stored in the compressed layer 5500, this data pair that has been read in is outputted to the combination calculation means 5300. And the combination calculation means 5300 refers to the transparent color information for the upper layer 300, and makes a decision as to whether or not the color specified by the color information included in this data pair that has been outputted is the transparent color. And, if the color specified by the color information included in this data pair is the transparent color, then the color information specified by this data pair is ignored, and combined image data is generated on the basis of the image data for the lower layer 400. On the other hand, if the color specified by the color information included in this data pair is not the transparent color, then the color information specified by this data pair is not ignored, and combined image data is generated having the color information in this data pair and length equal to its run-length.

Figure 8:
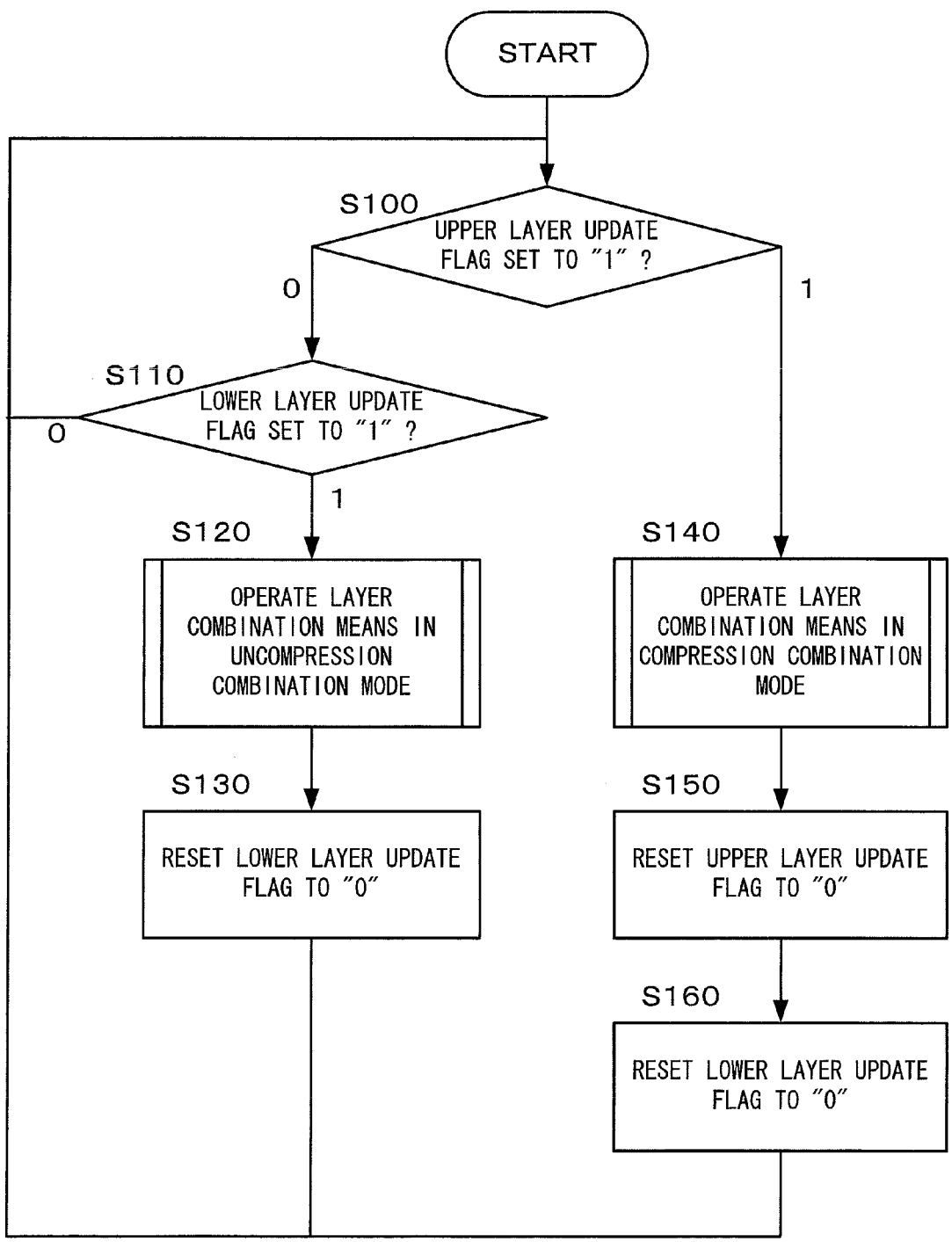
FIG. 8 is an example of a flow chart related to processing for determining a processing mode for the layer combination means.

Next, the processing by the layer combination means 500 of FIG. 5 will be explained with reference to a flow chart. FIG. 8 is a flow chart for processing to determine the processing mode for the layer combination means 500 on the basis of the value of the upper layer update flag 5700 and the value of the lower layer update flag 5600. The processing shown in FIG. 8 is executed by the CPU 1020.

When the processing of FIG. 8 starts, the CPU 1020 proceeds to a step S100. In this step S100, the CPU 1020 refers to the upper layer update flag 5700, and makes a decision as to whether or not this upper layer update flag 5700 is set to "1". If the upper layer update flag 5700 is set to "1", then the processing of FIG. 8 is transferred to a step S140, in which processing in the compression combination mode is started. On the other hand, if the upper layer update flag 5700 is reset to "0", then the processing of FIG. 8 proceeds to a step S110. In this step S110, the CPU 1020 refers to the lower layer update flag 5600, and makes a decision as to whether or not this lower layer update flag 5600 is set to "1". If the lower layer update flag 5600 is set to "1", then the processing of FIG. 8 proceeds to a step S120, in which processing in the uncompression combination mode is started. On the other hand, if the lower layer update flag 5600 is also reset to "0", then the CPU 1020 returns the processing of FIG. 8 to the step S100.

In the step S120 of FIG. 8, the CPU 1020 executes the layer combination means 500 in the uncompression combination mode. When the layer combination means 500 terminates its operation in the uncompression combination mode, then the processing of FIG. 8 proceeds to a step S130. In the step S130 of FIG. 8, the CPU 1020 resets the lower layer update flag 5600 to "0". And, when the lower layer update flag 5600 has been reset to "0", then the CPU 1020 returns the processing of FIG. 8 to the step S100.

In the step S140 of FIG. 8, the CPU 1020 executes the layer combination means 500 in the compression combination mode. When the layer combination means 500 terminates its operation in the compression combination mode, then the processing of FIG. 8 proceeds to a step S150. In the step S150 of FIG. 8, the CPU 1020 resets the upper layer update flag 5700 to "0". And, when the upper layer update flag 5700 has been reset to "0", the flow of control proceeds to a step S160. In the step S160 of FIG. 8, the CPU 1020 resets the lower layer update flag 5600 to "0". And, when the lower layer update flag 5600 has been reset to "0", then the CPU 1020 returns the processing of FIG. 8 to the step S100.

Figure 9:
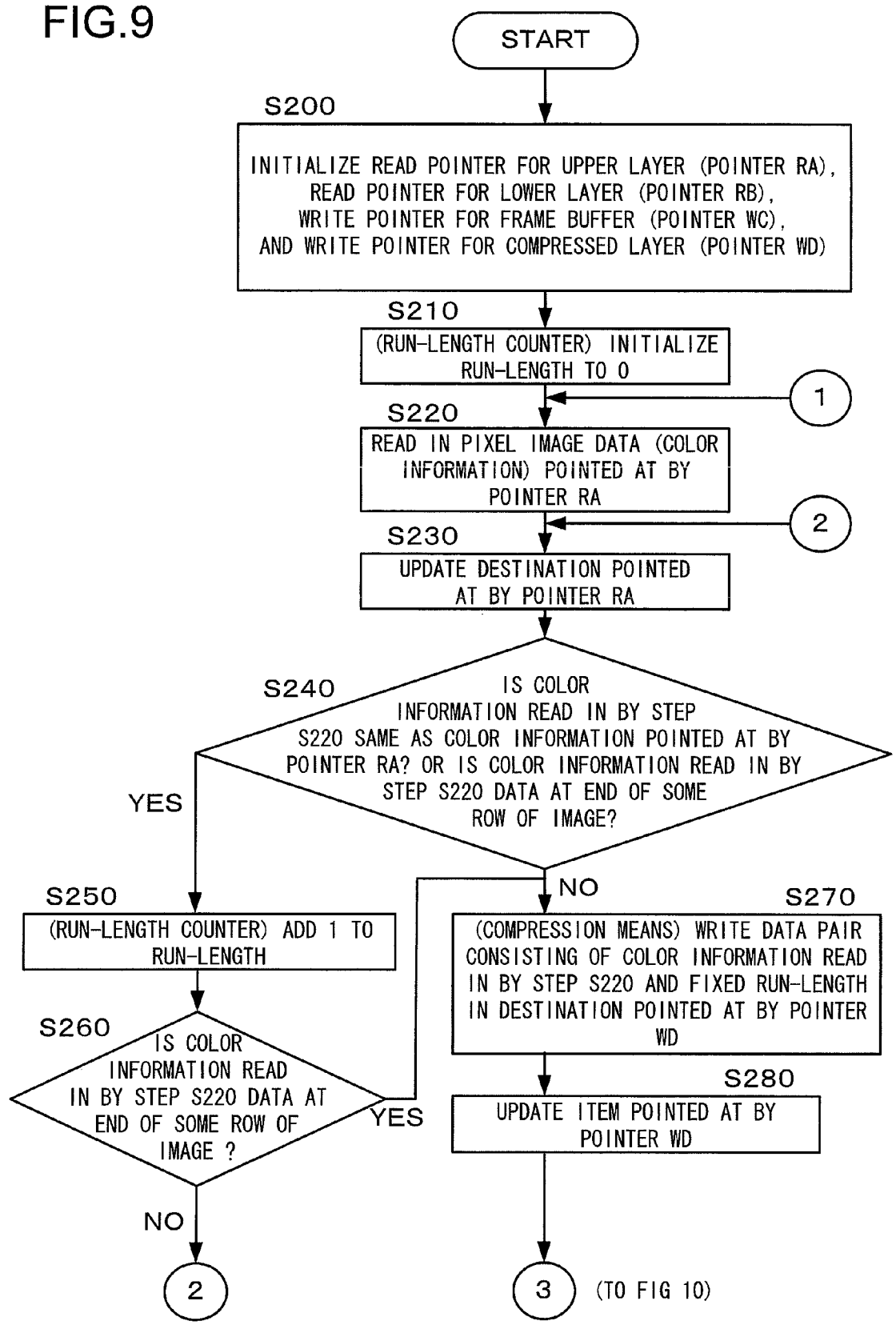
FIG. 9 is a flow chart related to processing by the layer combination means in a compression combination mode.
Figure 10:
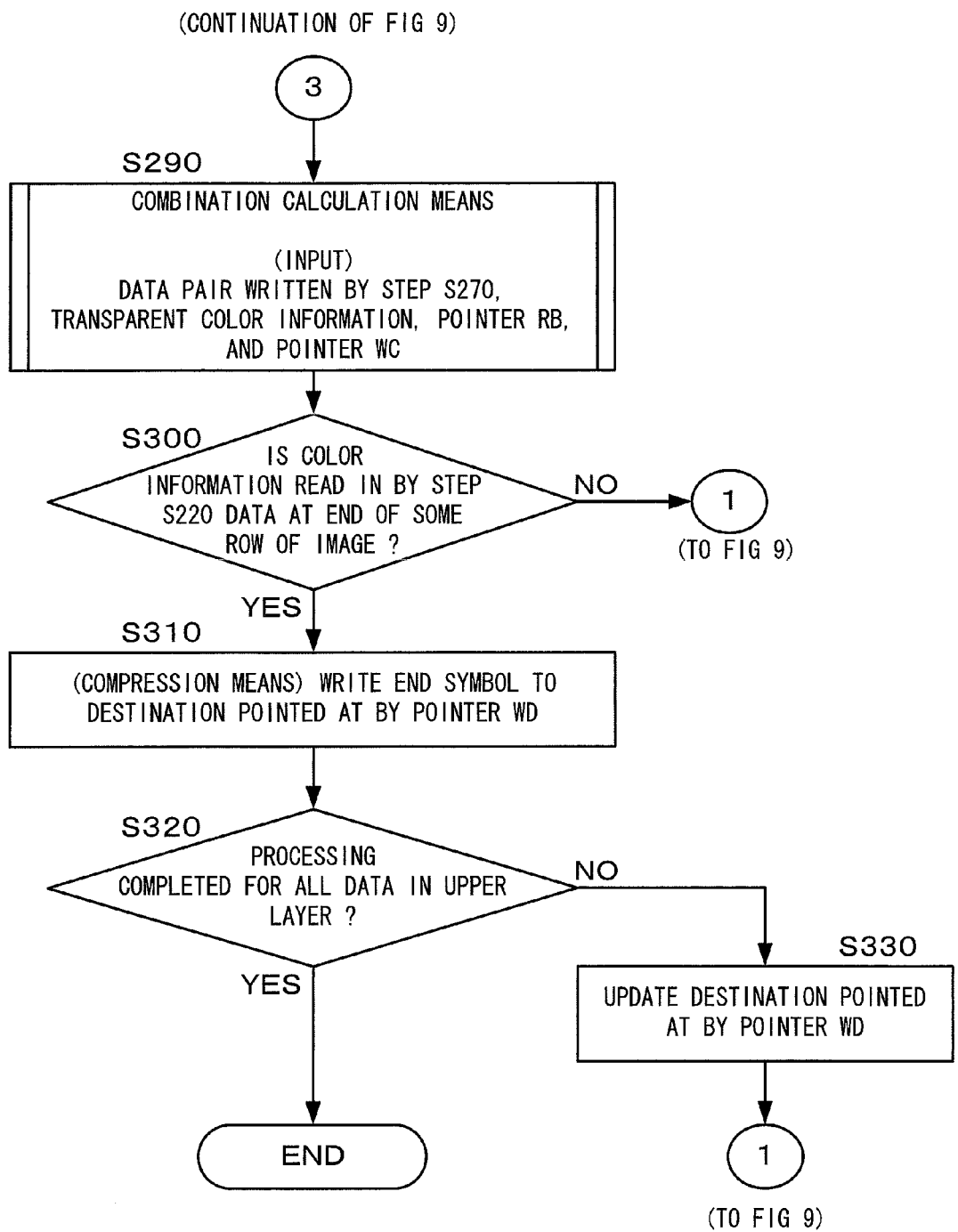
FIG. 10 is a flow chart related to processing by the layer combination means in the compression combination mode.

Next, the processing executed by the CPU 1020 in the step S140 of FIG. 8, in other words by the layer combination means 500 in the compression combination mode, will be explained. In this step S140, the processing of the compression means 5100, the combination calculation means 5300, and the run-length counter 5400 is performed while inputting the image data and the transparent color information for the upper layer 300 and the image data for the lower layer 400. FIGS. 9 and 10 are flow charts related to the processing executed by the CPU 1020 for the operation of the layer combination means 500 in the compression combination mode.

In the processing of FIGS. 9 and 10, pointer variables are used for the reading and writing of data to and from the upper layer 300, the lower layer 400, the frame buffer 600, and the compressed layer 5500. In the following, the pointer for reading in the image data for the upper layer 300 will be termed the "pointer RA". And the pointer for reading in the image data for the lower layer 400 will be termed the "pointer RB". Moreover, the pointer for writing the image data to the frame buffer 600 will be termed the "pointer WC". And the pointer for writing the compressed image data to the compressed layer 5500 will be termed the "pointer WD".

In the step S200 of FIG. 9, the CPU 1020 initializes these four pointers (the pointers RA, RB, WC, and WD). The pointer RA and the pointer RB are initialized so as to point at the data for the first pixels of the first rows of, respectively, the image data for the upper layer 300 and the image data for the lower layer 400. And the pointers WC and WD are initialized so as to point at the first image data in the frame buffer 600 and the first image data in the compressed layer 5500, respectively. The way in which these four pointer variables are initialized is shown in FIG. 11. In FIG. 11, the pointer RA points at the storage region in which the data for the pixel at the start of the first row of the image data 111 for the upper layer 300 is stored. The pointer RB points at the storage region in which the data for the pixel at the start of the first row of the image data 112 for the lower layer 400 is stored. The pointer WC points at the storage region at the start of the frame buffer 600 in which the combined image data 113 is to be stored. And the pointer WD points at the storage region at the start of the compressed layer 5500 in which the compressed image data 114 is to be stored. When this initialization of the four pointer variables has been completed, then the CPU 1020 advances the processing for the layer combination means 500 in this compression combination mode to a step 210.

In this step S210 of FIG. 9, the CPU 1020 controls the run-length counter 5400 to initialize the run-length to 0. When this initialization of the run-length to 0 has been completed, then the CPU 1020 advances the processing for the layer combination means 500 in this compression combination mode to a step 220.

In this step S220 of FIG. 9, the CPU 1020 reads in the image data, in other words the color information, for the upper layer 300 pointed at by the pointer RA. When this reading in of the color information for the upper layer 300 pointed at by the pointer RA has been completed, then the CPU 1020 advances the processing for the layer combination means 500 in this compression combination mode to a step 230.

Figure 12:
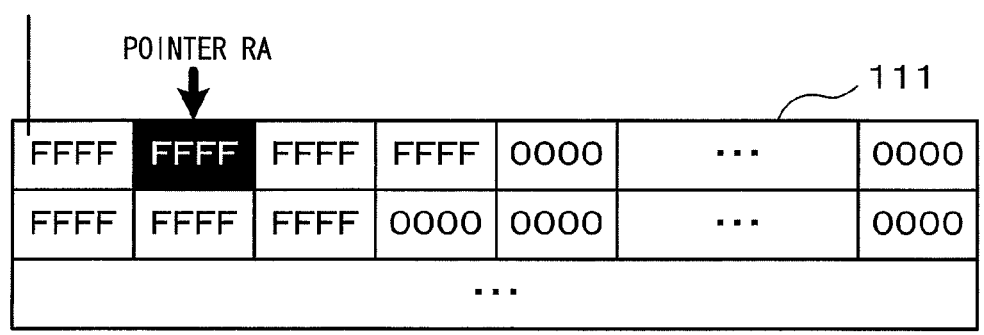
FIG. 12 is a further figure for explanation of processing by the layer combination means in the compression combination mode.

In this step S230 of FIG. 9, the CPU 1020 updates the pointer RA to point at the next pixel in the upper layer 300. The way in which the pixel at which the pointer RA points is changed is shown in FIG. 12. In FIG. 12, the data item in the image data 111 for the upper layer 300 at which the pointer RA points in FIG. 11 is updated one pixel to the right. It should be understood that, when the data item at which the pointer RA is pointing corresponds to the last pixel in its row, then it is updated so as to point at the first pixel in the next row. Moreover, if the data item at which the pointer RA is pointing corresponds to the last pixel in the last row, then it is updated to "null". When this updating of the data item at which the pointer RA points to the next pixel in the upper layer 300 has been completed, then the CPU 1020 advances the processing for the layer combination means 500 in this compression combination mode to a step 240.

In the step S240 of FIG. 9, the CPU 1020 makes decisions as to whether or not either one of the two conditions described below holds. If either the condition #1 or the condition #2 holds, then the CPU 1020 advances the flow of control of the layer combination means 500 in the compression combination mode to a step S250, while if neither one of these conditions #1 and #2 holds, then it advances the flow of control of the layer combination means 500 in the compression combination mode to a step S270. The condition #1 described below is one in which it is decided whether or not a succession of pixels having the same color information has terminated, and in which a decision is made as to whether or not the run-length for this color information has been fixed. And the condition #2 described below is for fixing the run-length, if a succession of pixels having the same color information straddles over rows. The decision in the condition #2 may, for example, be made by deciding whether or not the data pointed at by the pointer RA is the first pixel in a row.

Condition #1: Is the color information read in by the step S220 the same as the color information pointed at by the pointer RA?

Condition #2: Is the color information read in by the step S220 data at the end of some row of the image?

In the step S250 of FIG. 9, the CPU 1020 controls the run-length counter, and adds "1" to the run-length. And, having added "1" to the run-length, the CPU 1020 advances the flow of control of the layer combination means 500 in the compression combination mode to the step S260.

In the step S260 of FIG. 9, the CPU 1020 decides for a second time whether the condition #2 holds, and, if an affirmative decision has been reached, having fixed the run-length for the color information read by the step S220, the CPU 1020 advances the flow of control of the layer combination means 500 in the compression combination mode to the step S270, while, if a negative decision has been reached, the CPU 1020 returns the flow of control of the layer combination means 500 in the compression combination mode to the step S230.

In the step S270 of FIG. 9, the CPU 1020 controls the compression means 5100, and writes a data pair consisting of the run-length at the time point of starting this step S270 and the color information read in by the step S220 at the destination pointed at by the pointer WD. In other words, this fixed data pair is stored in the compressed layer 5500. Having thus stored this fixed data pair in the compressed layer 5500, the CPU 1020 advances the flow of control of the layer combination means 500 in the compression combination mode to the step S280.

In the step S280 of FIG. 9, the CPU 1020 updates the pointer WD to point at the next storage region in the compressed layer 5500. And, having thus updated the destination pointed at by the pointer WD to the next storage region in the compressed layer 5500, the CPU 1020 advances the flow of control of the layer combination means 500 in the compression combination mode to the step S290.

Figure 13:
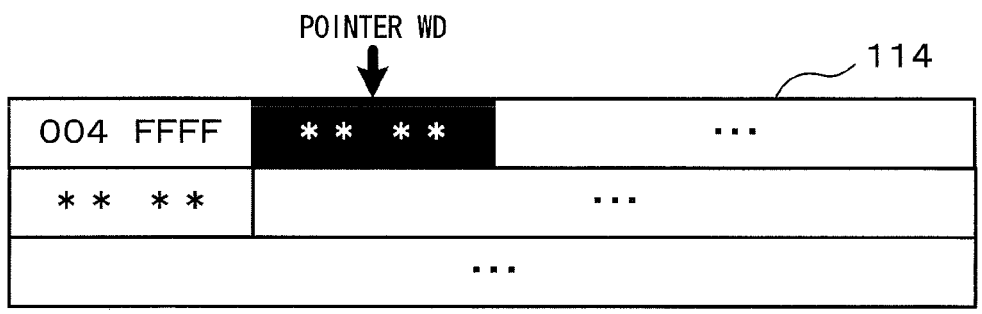
FIG. 13 is a further figure for explanation of processing by the layer combination means in the compression combination mode.

An example of the compressed image data stored in the compressed layer 5500 at the time point that the step S280 of FIG. 9 ends is shown in FIG. 13. FIG. 13 is an example showing the situation when the compressed image data 114 and the pointer WD thereto have been updated by the step S270 and the step S280. In FIG. 11, due to the processing of the step S270, the data pair "004 FFFF" that consists of the color information "FFFF" for the image data 111 and its run-length of "4" is stored in the storage region pointed at by the pointer WD. Moreover, due to the processing of the step S280, the storage region pointed at by the pointer WD is advanced by one from the storage region pointed at in FIG. 11. When the run-length for the next color information "0000" of the image data 111 has been fixed, this will be stored in the storage region pointed at by the pointer WD in FIG. 13.

In the step S290 of FIG. 10, the CPU 1020 performs the processing of the combination calculation means 5300, while inputting the data pair that was written in the step S270, the transparent color information for the upper layer 300 stored in the transparent color information storage region 5310, the pointer RB, and the pointer WC. And, by executing the combination calculation means 5300, the CPU 1020 writes, in the storage region for the frame buffer 600, combined image data for a number of pixels equal to the run-length included in the data pair from the position at which the pointer WC points. An example of the result of executing the combined image data write processing performed by the step S290 is shown in FIG. 14. FIG. 14 is the output result of the combination calculation means 5300, to which the data pair "004 FFFF" written to the compressed image data 114 in the example of FIG. 13, the transparent color information indicating that the color specified by the color information "FFFF" is not the transparent color, and the pointer RB and the pointer WC of FIG. 11 have been inputted. In FIG. 14, including the position at which the pointer WC of FIG. 11 points, just four items of color information "FFFF" are stored.

As shown in FIG. 14, after the processing of the step S290 has been completed, the position in the frame buffer 600 at which the pointer WC points has also shifted by just the run-length, so that it is shifted to the next storage region for writing data. And the position at which the pointer RB that is the pointer to the image data in the lower layer 400 shifts is also updated by just the run-length during the processing of the step S290, together with the shifting of the pointer WC. Thus, the pixel positions in the upper layer 300, the lower layer 400, and the frame buffer 600 at which the pointer RA, the pointer RB, and the pointer WC respectively point become the same after the processing of the step S290 has been executed. An example of this is shown in FIG. 15. FIG. 15 is a figure showing the results of executing the processing of the step S290 upon the pointer RA, the pointer RB, and the pointer WC shown in FIG. 11. The pointer RA has been shifted four elements from the position of FIG. 11 to the position shown in FIG. 15, since the step S230 of FIG. 9 was executed four times, until the run-length of the color information "FFFF" that was read in by the step S220 was fixed. And the pointer WC has been shifted in the step S290 by just the amount of the run-length (in this case, by four elements) while writing the combined image data pixel by pixel in the frame buffer 600. Moreover, the pointer RB has been shifted to match the pointer WC.

When in the step S290 of FIG. 10 the execution of the combination calculation means 5300 has been completed, then the CPU 1020 advances the flow of control to a step S300. In this step S300 of FIG. 10, the CPU 1020 makes a decision for a second time as to whether or not the condition #2 holds. If an affirmative decision is reached, then the CPU 1020 advances the processing of the layer combination means 500 in the compression combination mode to a step S310, while, if a negative decision is reached for this condition #2, then the CPU 1020 returns the processing to the step S220 of FIG. 9.

In the step S310 of FIG. 10, the CPU 1020 controls the compression means 5100 and writes the end symbol "000" in the storage region at which the pointer WD points. And, having thus written the end symbol "000" in the destination at which the pointer WD points, then the CPU 1020 advances the processing of the layer combination means 500 in the compression combination mode to a step S320.

In this step S320 of FIG. 10, the CPU 1020 makes a decision as to whether or not the processing of the layer combination means 500 in the compression combination mode has been completed for all of the data included in the image data for the upper layer 300. This decision may be performed by deciding whether or not, for example, the pointer RA is pointing at "null". If an affirmative decision is reached, then the CPU 1020 terminates this processing of the layer combination means 500 in the compression combination mode, whereas if a negative decision is reached, then the CPU 1020 advances this processing of the layer combination means 500 in the compression combination mode to a step S330.

Figure 16:
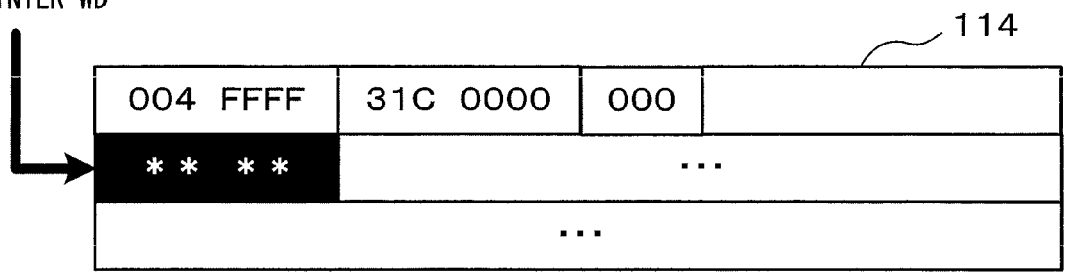
FIG. 16 is a further figure for explanation of processing by the layer combination means in the compression combination mode.

In the step S330 of FIG. 10, the CPU 1020 shifts the storage region at which the pointer WD points to the first item of the next row of the compressed image data. An example of the result of executing this processing of the step S330 is shown in FIG. 16. In FIG. 16, the first row of the compressed image data 114 ends with the end symbol "000", and the pointer WD points at the data in the second row. Then the CPU 1020 returns the processing of the layer combination means 500 in the compression combination mode to the step S220 of FIG. 9.

Next, the processing of the combination calculation means 5300 will be explained with reference to the flow chart shown in FIG. 17. The combination calculation means shown in FIG. 17 is processing executed by the CPU 1020, and, for its input, it needs the data pair PA related to the upper layer 300, the read pointer RB for the lower layer 400, the transparent color information for the upper layer 300, and the write pointer WC to the frame buffer 600.

Figure 17:
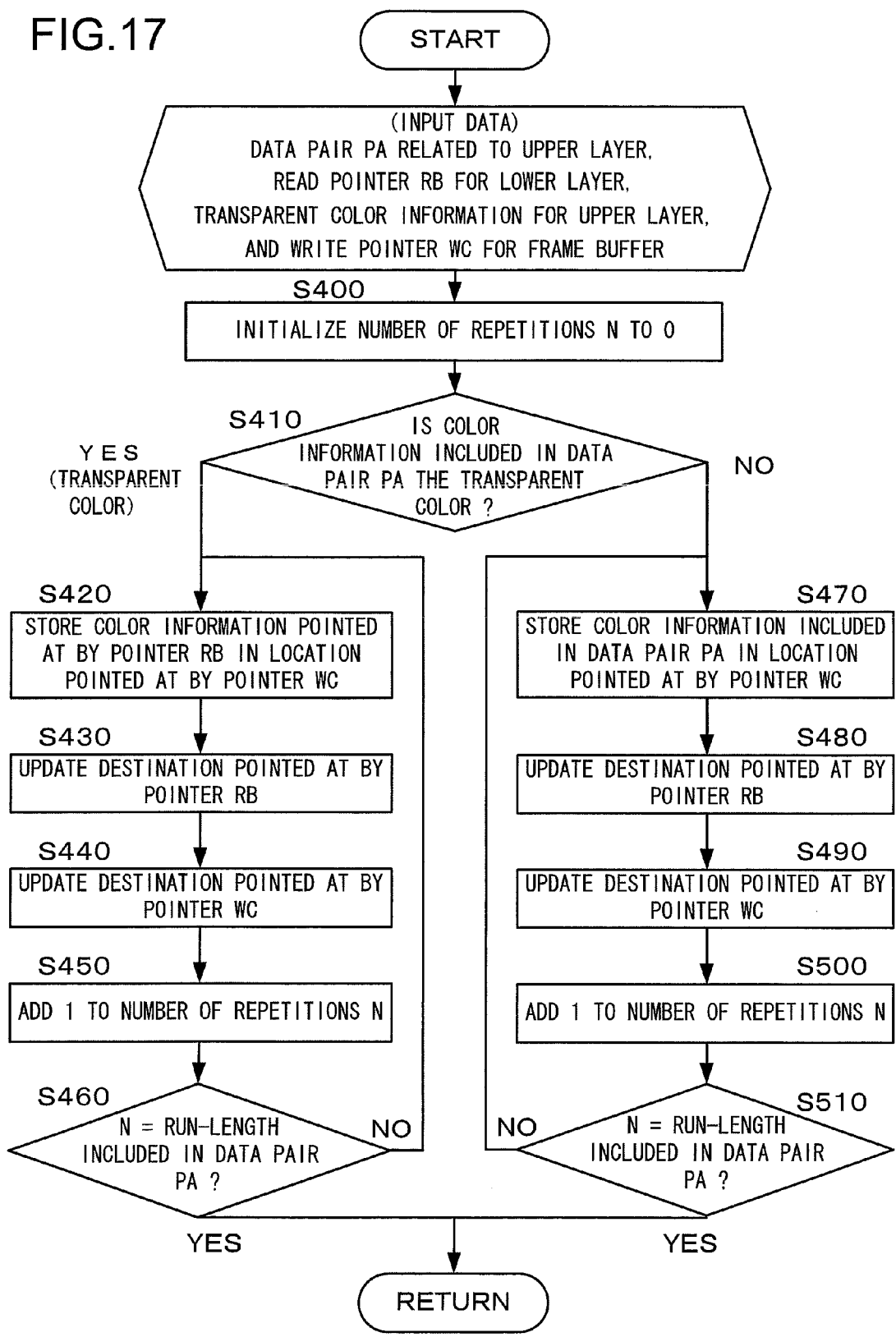
FIG. 17 is an example of a flow chart related to processing by a combination calculation means.

In the flow chart of FIG. 17, the number of repetitions N is used as an internal variable. In a step S400 of FIG. 17, the CPU 1020 initializes the number of repetitions N to 0. And, after having initialized the number of repetitions N to 0, the CPU 1020 advances the processing of the combination calculation means 5300 to a step S410.

In this step S410 of FIG. 17, on the basis of the transparent color information for the upper layer 300 that has been inputted, the CPU 1020 makes a decision as to whether or not the color information included in the data pair PA that has been inputted is the transparent color. If the color information included in this data pair PA is the transparent color, then the CPU 1020 advances the processing of the combination calculation means 5300 to a step S420, whereas, if the color information included in this data pair PA is not the transparent color, then it advances the processing to a step S470.

In the processing of FIG. 17 from the step S420 to the step S460, since the color information included in the data pair PA is the transparent color, accordingly the images are combined while ignoring just a total of run-length of items in the image data for the upper layer 300. And since, using the color information included in the data pair PA, it is possible to decide for a total of run-length pixels in the upper layer 300 all together as to whether or not they are of the transparent color, accordingly it is possible to perform the image combination at higher speed than in the combination processing of the prior art, in which it was decided whether the pixels were of transparent color or not one pixel at a time.

In the step S420 of FIG. 17, the CPU 1020 stores (i.e. copies) the color information pointed at by the pointer RB to the storage region pointed at by the pointer WC. And, after having thus copied the color information pointed at by the pointer RB to the storage region pointed at by the pointer WC, then the CPU 1020 advances the processing of the combination calculation means 5300 to a step S430.

In this step S430 of FIG. 17, the CPU 1020 updates the destination at which the pointer RB points to the next data item in the lower layer 400. And, after having thus updated the destination at which the pointer RB points, then the CPU 1020 advances the processing of the combination calculation means 5300 to a step S440. In this step S440 of FIG. 17, the CPU 1020 updates the destination at which the pointer WC points to the next storage region of the frame buffer 600. And, after having thus updated the destination at which the pointer WC points, then the CPU 1020 advances the processing of the combination calculation means 5300 to a step S450.

In the step S450 of FIG. 17, the CPU 1020 adds "1" to the number of repetitions N. And, after having thus added "1" to the number of repetitions N, then the CPU 1020 advances the processing of the combination calculation means 5300 to a step S460.

In the step S460 of FIG. 17, the CPU 1020 makes a decision as to whether or not the number of repetitions N has reached the same value as the run-length of the data pair PA. In other words, it makes a decision as to whether or not the processing from the step S420 to the step S440 has been repeated by just a number of times equal to the run-length of the data pair PA. If the number of repetitions N has reached the same value as the run-length of the data pair PA, then the CPU 1020 terminates this processing by the combination calculation means 5300, whereas, if the number of repetitions N is still lower than the run-length of the data pair PA, then the CPU 1020 returns the processing of the combination calculation means 5300 to the step S420.

In the step S470 of FIG. 17, since the color information included in the data pair PA is not the transparent color, accordingly the CPU 1020 stores this color information in the storage region of the frame buffer 600 at which the pointer WC points. And, after having stored this color information included in the data pair PA in the storage region of the frame buffer 600 at which the pointer WC points, then the CPU 1020 advances the processing of the combination calculation means 5300 to a step S480.

In the step S480 of FIG. 17, the CPU 1020 updates the destination at which the pointer RB points to the next data item in the lower layer 400. And, after having thus updated the destination at which the pointer RB points, then the CPU 1020 advances the processing of the combination calculation means 5300 to a step S490. In this step S490 of FIG. 17, the CPU 1020 updates the destination at which the pointer WC points to the next storage region of the frame buffer 600. And, after having thus updated the destination at which the pointer WC points, then the CPU 1020 advances the processing of the combination calculation means 5300 to a step S500.

In the step S500 of FIG. 17, the CPU 1020 adds "1" to the number of repetitions N. And, after having thus added "1" to the number of repetitions N, then the CPU 1020 advances the processing of the combination calculation means 5300 to a step S510.

In the step S510 of FIG. 17, the CPU 1020 makes a decision as to whether or not the number of repetitions N has reached the same value as the run-length of the data pair PA. If the number of repetitions N has reached the same value as the run-length of the data pair PA, then the CPU 1020 terminates this processing by the combination calculation means 5300, whereas, if the number of repetitions N is still lower than the run-length of the data pair PA, then the CPU 1020 returns the processing of the combination calculation means 5300 to the step S470.

The above completes the explanation of the layer combination means 500 in the compression combination mode. In the step S410, the combination calculation means 5300 of FIG. 17 decides whether or not all of the pixels included in the data pair PA (the number of which is run-length) are transparent in color. By doing this, it is possible to perform combination of the display layers at higher speed than with the prior art technique, in which it was decided whether the pixels were transparent in color or not pixel by pixel.

Figure 18:
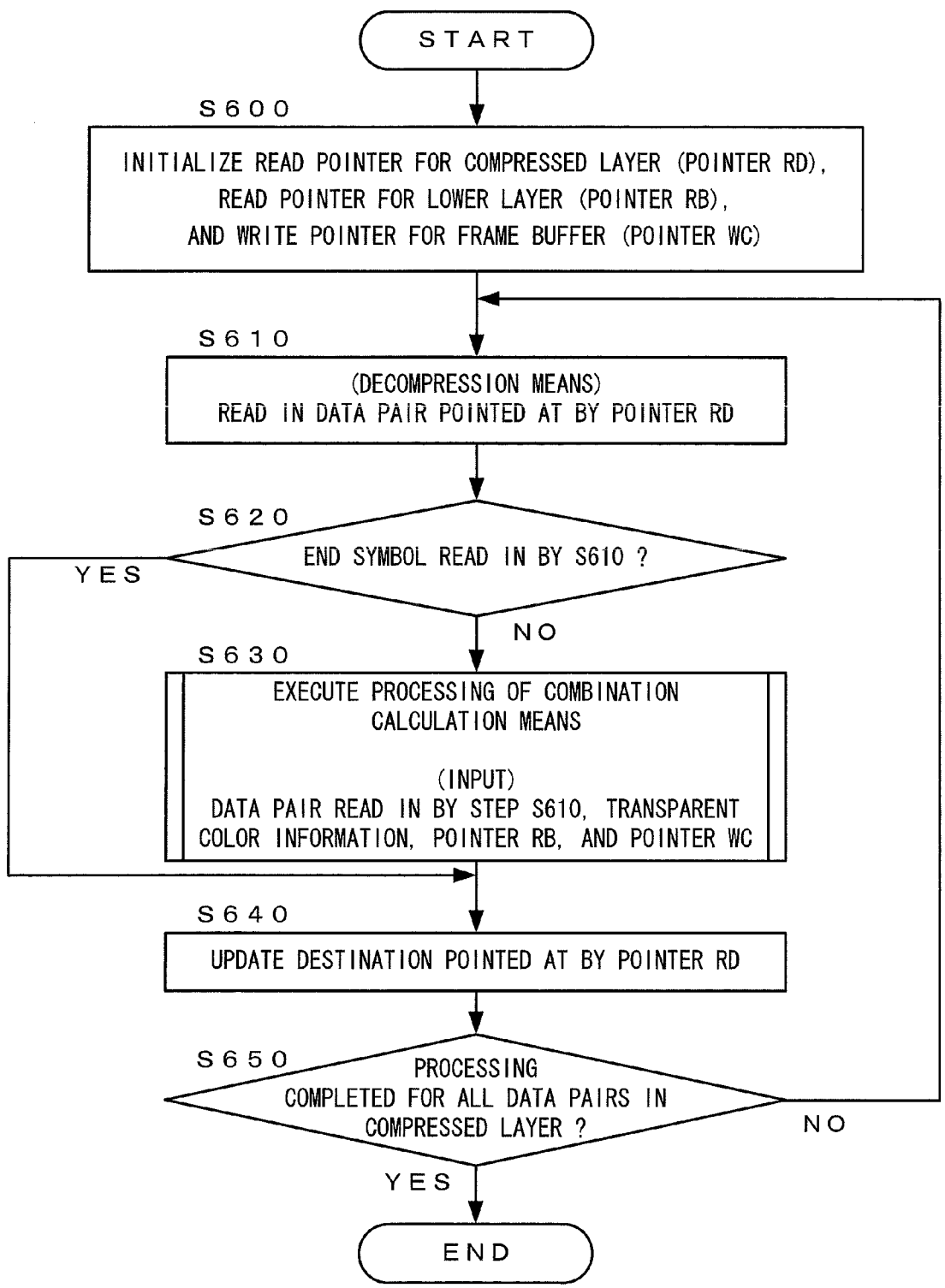
FIG. 18 is an example of a flow chart related to processing by the layer combination means in an uncompression combination mode.

Next, the processing executed by the CPU 1020 in the step S120 of FIG. 8, in other words by the layer combination means 500 in the uncompression combination mode, will be explained. In this step S120, the processing of the decompression means 5200 and the combination calculation means 5300 is performed while inputting the compressed image data stored in the compressed layer 5500, the transparent color information for the upper layer 300, and the image data for the lower layer 400. FIG. 18 is a flow chart related to the processing executed by the CPU 1020 for the operation of the layer combination means 500 in the uncompression combination mode.

In the step S600 of FIG. 18, the CPU 1020 initializes three pointers (i.e. the pointers RD, RB, and WC). The pointer RB and the pointer WC are the same as those explained in connection with FIG. 9. The pointer RB is the pointer for reading in the image data of the lower layer 400. And the pointer WC is the pointer for writing the combined image data to the frame buffer 600. Moreover, the pointer RD is a pointer for reading in the compressed image data from the compressed layer 5500, in other words a pointer for reading in data pairs from the compressed layer 5500. The CPU 1020 initializes the pointer RB so that it points at the image data for the first pixel in the first row of the lower layer 400. And the CPU 1020 initializes the pointer WC so that it points at the first storage region in the frame buffer 600. Moreover, the CPU 1020 initializes the pointer RD so that it points at the first data pair in the compressed layer 5500. When the CPU 1020 has completed initialization of these three pointers, it advances the processing of the layer combination means 500 in the uncompression combination mode to a step S610.

In the step S610 of FIG. 18, the CPU 1020 reads in the data pair from the storage region of the compressed layer 5500 at which the pointer RD points. And, having read in the data pair from the storage region of the compressed layer 5500 at which the pointer RD points, then the CPU 1020 advances the processing of the layer combination means 500 in the uncompression combination mode to a step S620.

In the step S620 of FIG. 18, the CPU 1020 makes a decision as to whether or not the end symbol "000" has been read in by the step S610. If the end symbol "000" has been read in then the CPU 1020 advances the processing of the layer combination means 500 in the uncompression combination mode to a step S640, while if the end symbol "000" has not been read in then it advances the processing to a step S630.

In the step S630 of FIG. 18, the CPU 1020 executes the processing of the combination calculation means 5300 shown in FIG. 17, using as input the data pair read in by the step S610, the transparent color information for the upper layer 300 stored in the transparent color information storage region 5310, the pointer RB, and the pointer WC. And, having completed the processing of the combination calculation means 5300, the CPU 1020 advances the processing of the layer combination means 500 in the uncompression combination mode to the step S640.

In the step S640 of FIG. 18, the CPU 1020 updates the destination pointed at by the pointer RD to the next data pair in the compressed layer 5500. But, if the end symbol "000" was read in by the step S610, then the CPU 1020 updates the destination pointed at by the pointer RD to the first data pair in the next row of the compressed layer 5500. And, having updated the destination pointed at by the pointer RD, the CPU 1020 advances the processing of the layer combination means 500 in the uncompression combination mode to a step S650.

In this step S650 of FIG. 18, the CPU 1020 makes a decision as to whether or not the processing of the combination calculation means 5300 has been executed for all of the data pairs stored in the compressed layer 5500. For example, the CPU 1020 may decide whether or not the end symbol "000" in the final row of the compressed layer 5500 is being pointed at by the pointer RD. If the CPU 1020 has decided that the processing of the combination calculation means 5300 has been executed for all of the data pairs stored in the compressed layer 5500, then it terminates the processing of the layer combination means 500 in the uncompression combination mode, whereas if it has decided that the processing of the combination calculation means 5300 has not been completed for all of the data pairs, then it returns the processing of the layer combination means 500 in the uncompression combination mode to the step S610.

According to the embodiment explained above, the following advantageous operational effects are obtained.

The display control device of this embodiment is a navigation device 1 that displays, upon the display device 800, combined image data obtained by combining the image data for a plurality of display layers, i.e. for the upper layer 300 and for the lower layer 400. The images upon the upper layer 300 and the lower layer 400 are made up of a plurality of pixels 21, and this image data includes color information related to the color of each of the plurality of pixels 21. The color information for handling the transparent color in the image data for the upper layer 300 is stored as transparent color information in the transparent color information storage region 5310 of the main memory 1050. The CPU 1020 makes decisions as to whether or not the image data for each of the upper layer 300 and the lower layer 400 has been updated, and controls the upper layer update flag 5700 and the lower layer update flag 5600 accordingly. This navigation device 1 is provided with the run-length counter 5400 that calculates the run-length related to the color information included in the image data for the upper layer 300, the combination calculation means 5300 that combines the image data for the upper layer 300 and the image data for the lower layer 400 and generates the combined image data, and the display control unit 700 that outputs the combined image data generated by the combination calculation means 5300 to the display device 800, in order to display the combined image upon the display device 800. And, when the upper layer 300 has been updated and the upper layer update flag 5700 has been set to "1", in the step S410 of FIG. 17, the combination calculation means 5300 of the navigation device 1 makes a decision for the calculated number run-length of pixels all together, the run-length being calculated by the run-length counter 5400 controlled by the CPU 1020 in the steps S210 through S270 of FIG. 9, as to whether or not the color information of the pixels is the transparent color (in the step S290 of FIG. 10 and the step S630 of FIG. 18). Due to this, as with the combination calculation means 5300, in the combination processing for combining the plurality of display layers, it is possible to decide all together for a total of run-length of the pixels in the display layer as to whether or not they are of the transparent color, and, by ignoring a total of run-length of the pixels if they are of the transparent color, it is possible to skip over those pixels efficiently. As a result, it is possible to combine the image data at a higher speed than during the combination processing of the prior art, in which, one pixel at a time, the color information for each pixel in the display layer was read out and the decision was made as to whether it was the transparent color. Moreover, this type of combination processing can be executed at high speed by software only, without the employment of any dedicated hardware.

The embodiment explained above may be implemented in the following variant ways.

[1] In the embodiment explained above, a case was explained in which images upon two display layers, i.e. the upper layer 300 and the lower layer 400, were combined together. However, the present invention is not to be considered as being limited by the number of image display layers that are combined together being two. In other words, the present invention can also be applied to a case in which images upon three or more display layers are combined together. In this case, in the main memory 1050, there are further provided: storage regions in which the image data for each of the display layers is stored; a plurality of compressed layers in which compressed image data that has been obtained by compressing the images on all of the display layers other than the lowermost layer is respectively stored; and a transparent color information storage region in which is stored transparent color information for each of the display layers other than the lowermost layer. And the image data for the lowermost layer is generated by a drawing means that is similar to the lower layer drawing means 200, and is stored in a storage region of the main memory 1050. Moreover, the image data for the display layers other than the lowermost layer is generated, along with the corresponding transparent color information, by a drawing means that is similar to the upper layer drawing means 100, and is stored in the respective storage region of the main memory 1050. And an update flag like the upper layer update flag 5700 and the lower layer update flag 5600 and so on is provided for each of the display layers.

Figure 23:
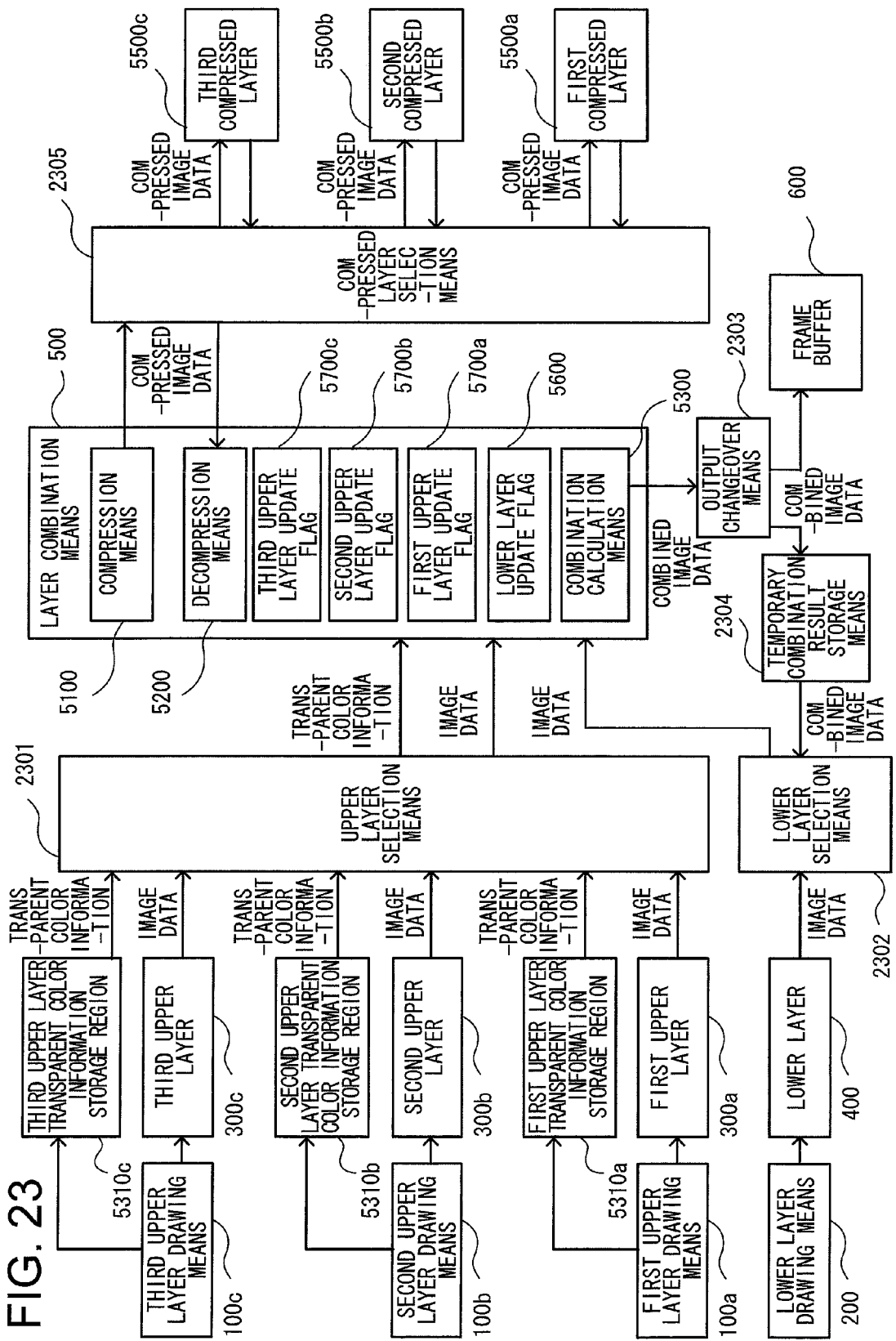
FIG. 23 is a functional structural diagram of a display control device related to combination processing for combining three or more display layers.

FIG. 23 is a functional structural diagram for the display control device, when four display layers are to be combined.

In the example of FIG. 23, a first upper layer 300*a*, a second upper layer 300*b*, and a third upper layer 300*c* are to be combined with a lowermost layer 400. The first upper layer 300*a* is a display layer one level above the lowermost layer 400. And the second upper layer 300*b* is a display layer that is one level above the first upper layer 300*a*. Moreover, in a similar manner, the third upper layer 300*c* is a display layer that is one level above the second upper layer 300*b*. The combination of the lowermost layer 400 with these upper layers is performed by executing, in the specified order, combination thereof with the first upper layer 300*a*, combination of that result with the second upper layer 300*b*, and combination of that result with the third upper layer 300*c*. And, in a case in which the number of display layers to be combined is other than four, in the same manner, the lowermost layer 400 should be combined with the other layers in order of ranking, i.e. starting from the lowest ranking one thereof.

The image data stored in the first upper layer 300*a* is generated by the first upper layer drawing means 100*a*. Moreover, the first upper layer drawing means 100*a* generates transparent color information related to the image data for the first upper layer 300*a*, and stores this information in a first upper layer color information storage region 5310*a*. In a similar manner to the upper layer drawing means 100, the CPU 1020 executes the processing for this first upper layer drawing means 100*a* by controlling the drawing unit 1030 and so on. The compressed image data for the first upper layer 300*a* is stored in a first compressed layer 5500*a*. And a first upper layer update flag 5700*a* is an update flag for the first upper layer 300*a*. When the image data for the first upper layer 300*a* has been updated, the value of this first upper layer update flag 5700*a* is set to "1" by the CPU 1020. Storage regions for the first upper layer 300*a*, the first upper layer transparent color information storage region 5310*a*, and the first compressed layer 5500*a* are provided in the main memory 1050; and similarly for the second upper layer 300*b* and for the third upper layer 300*c*. In FIG. 23, there are provided a second upper layer drawing means 100*b*, a second upper layer transparent color information storage region 5310*b*, a second compressed layer 5500*b*, and a second upper layer update flag 5700*b* for the second upper layer 300*b*. Moreover, there are provided a third upper layer drawing means 100*c*, a third upper layer transparent color information storage region 5310*c*, a third compressed layer 5500*c*, and a third upper layer update flag 5700*c* for the third upper layer 300*c*.

In addition to the display control device shown in FIG. 4, the display control device shown in FIG. 23 includes an upper layer selection means 2301, a lower layer selection means 2302, an output changeover means 2303, a temporary combination result storage means 2304, and a compressed layer selection means 2305.

According to control by the CPU 1020, the upper layer selection means 2301 selects one of the upper layers, i.e. one among the first upper layer 300*a*, the second upper layer 300*b*, and the third upper layer 300*c* for output to the layer combination means 500. And the upper layer selection means 2301 outputs the image data and the transparent color information of the upper layer that has been selected to the layer combination means 500.

Moreover, according to control by the CPU 1020, the lower layer selection means 2302 selects either the lowermost layer 400 or the temporary combination result storage means 2304. If the lower layer selection means 2302 has selected the lowermost layer 400, then the image data of the lowermost layer 400 is outputted to the layer combination means. But if the lower layer selection means 2302 has selected the temporary combination result storage means 2304, then the combined image data that is temporarily stored in the temporary combination result storage means 2304 is outputted to the layer combination means 500.

And, according to control by the CPU 1020, the output changeover means 2303 selects the destination for storage of the combined image data generated by the combination calculation means 5300 of the layer combination means 500. The output changeover means 2303 stores the combined image data either in the frame buffer 600 or in the temporary combination result storage means 2304. The temporary combination result storage means 2304 is a storage region provided in the main memory 1050, and is a storage region for temporary storage of the combined image data generated by the combination calculation means 5300, until combination of the image data for all of the three upper layers with the image data for the lowermost layer 400 has been completed. Thus, until combination of the image data for all of the three upper layers with the image data for the lowermost layer 400 has been completed, the temporary combination result storage means 2304 is selected by the output changeover means 2303, so that the combined image data is stored in the temporary combination result storage means 2304. On the other hand, when combination of the image data for all of the three upper layers with the image data for the lowermost layer 400 has been completed, the frame buffer 600 is selected by the output changeover means 2303, so that the combined image data is stored in the frame buffer 600. And, when the temporary combination result storage means 2304 is selected by the lower layer selection means 2302, then the combined image data that is stored in the temporary combination result storage means 2304 is outputted to the layer combination means 500. Then the next upper layer is combined therewith by the combination calculation means 5300.

According to control by the CPU 1020, the compressed layer selection means 2305 selects one from among the first compressed layer 5500a, the second compressed layer 5500b, and the third compressed layer 5500c to store compressed image data in and to read out from. And the compression means 5100 of the layer combination means 500 stores the compressed image data in the compressed layer that has been selected by the compressed layer selection means 2305. Moreover, the decompression means 5200 of the layer combination means 500 reads out the compressed image data from the compressed layer that has been selected by the compressed layer selection means 2305, and recreates the original image data.

Figure 24:
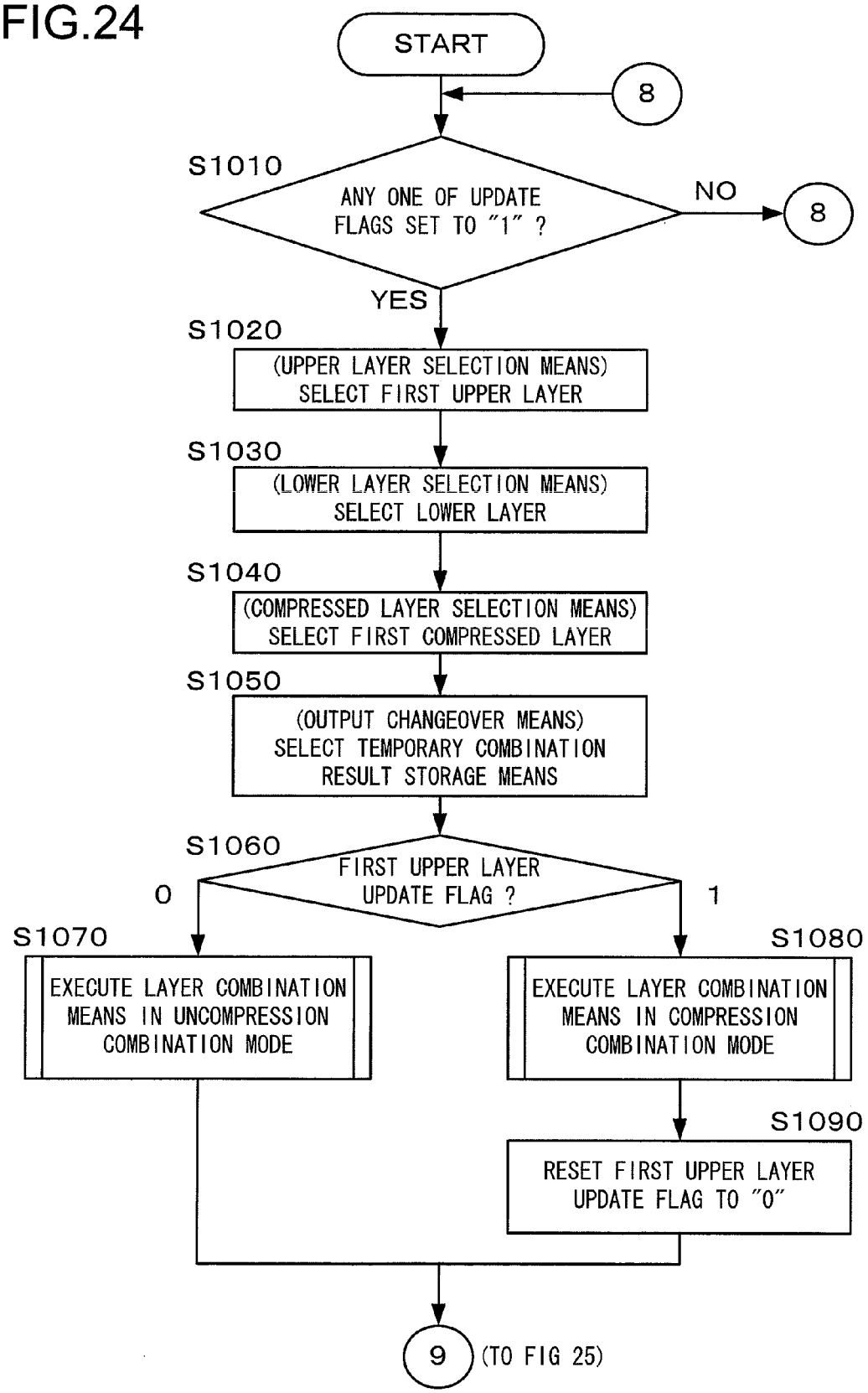
FIG. 24 is an example of a flow chart related to combination processing for combining three or more display layers.

FIGS. 24 through 26 are flow charts showing processing for combining the four display layers on the basis of the four update flags shown in FIG. 23. The processing shown in FIGS. 24 through 26 is executed by the CPU 1020.

In a step S1010 of FIG. 24, the CPU 1020 makes a decision as to whether or not any one of the four update flags, i.e. the lower layer update flag 5600, the first upper layer update flag 5700a, the second upper layer update flag 5700b, and the third upper layer update flag 5700c, is set to "1". The processing of FIG. 24 waits until any one of the four update flags is set to "1", and when one of the four update flags is set to "1", then the processing flow proceeds to a step S1020.

In this step S1020, the CPU 1020 controls the upper layer selection means 2301 to select the first upper layer 300a. And, having selected the first upper layer 300a with the upper layer selection means 2301, the CPU 1020 advances the processing of FIG. 24 to a step S1030.

In this step S1030, the CPU 1020 controls the lower layer selection means 2302 to select the lowermost layer 400. And, having selected the lowermost layer 400 with the lower layer selection means 2302, the CPU 1020 advances the processing of FIG. 24 to a step S1040.

In this step S1040, the CPU 1020 controls the compressed layer selection means 2305 to select the first compressed layer 5500a. And, having selected the first compressed layer 5500a with the compressed layer selection means 2305, the CPU 1020 advances the processing of FIG. 24 to a step S1050.

In this step S1050, the CPU 1020 controls the output changeover means 2303 to select the temporary combination result storage means 2304. And, having selected the temporary combination result storage means 2304 with the output changeover means 2303, the CPU 1020 advances the processing of FIG. 24 to a step S1060.

In this step S1060, the CPU 1020 refers to the first upper layer update flag 5700a, and makes a decision as to whether or not this first upper layer update flag 5700a is set to "1". If the first upper layer update flag 5700a is set to "1", then the CPU 1020 advances the processing of FIG. 24 to a step S1080, whereas if the first upper layer update flag 5700a is reset to "0", then the CPU 1020 advances the processing to a step S1070.

In this step S1070, the CPU 1020 executes the layer combination means 500 in the uncompression combination mode. The decompression means 5200 reads in a data pair from the compressed image data of the first upper layer 300a stored in the first compressed layer 5500a. And, on the basis of the color information and the run-length included in this data pair, the image data for the first upper layer 300a that is compressed is combined with the image data for the lowermost layer 400, and this combined image data is stored in the temporary combination result storage means 2304. And, having completed the processing of the layer combination means 500 in the uncompression combination mode, the CPU 1020 advances the processing to a step S1100 of FIG. 25.

In this step S1080, the CPU 1020 executes the layer combination means 500 in the compression combination mode. The image data for the first upper layer 300a is compressed by the compression means 5100, and this compressed image data is stored in the first compressed layer 5500a. And the image data for the first upper layer 300a is combined with the image data for the lowermost layer 400 on the basis of the run-length that is calculated by this compression process, and this combined image data is stored in the temporary combination result storage means 2304. And, having completed this processing by the layer combination means 500 in the compression combination mode, the CPU 1020 advances the processing of FIG. 24 to a step S1090.

In this step S1090, the CPU 1020 resets the first upper layer update flag 5700a to "0". And, having reset the first upper layer update flag 5700a to "0", the CPU 1020 advances the processing of FIG. 25 to a step S1100.

In the step S1100 of FIG. 25, the CPU 1020 controls the upper layer selection means 2301 to select the second upper layer 300b. And, having selected the second upper layer 300b with the upper layer selection means 2301, the CPU 1020 advances the processing of FIG. 25 to a step S1110.

In this step S1110, the CPU 1020 controls the lower layer selection means 2302 to select the temporary combination result storage means 2304. And, having selected the temporary combination result storage means 2304 with the lower layer selection means 2302, the CPU 1020 advances the processing of FIG. 25 to a step S1120.

In this step S1120, the CPU 1020 controls the compressed layer selection means 2305 to select the second compressed layer 5500b. And, having selected the second compressed layer 5500*b* with the compressed layer selection means 2305, the CPU 1020 advances the processing of FIG. 25 to a step S1130.

In this step S1130, the CPU 1020 controls the output changeover means 2303 to select the temporary combination result storage means 2304. And, having selected the temporary combination result storage means 2304 with the output changeover means 2303, the CPU 1020 advances the processing of FIG. 25 to a step S1140.

In this step S1140, the CPU 1020 refers to the second upper layer update flag 5700*b*, and makes a decision as to whether or not this second upper layer update flag 5700*b* is set to "1". If the second upper layer update flag 5700*b* is set to "1", then the CPU 1020 advances the processing of FIG. 25 to a step S1160, whereas if the second upper layer update flag 5700*b* is reset to "0", then the CPU 1020 advances the processing to a step S1150.

In this step S1150, the CPU 1020 executes the layer combination means 500 in the uncompression combination mode. The decompression means 5200 reads in a data pair from the compressed image data of the second upper layer 300*b* stored in the second compressed layer 5500*b*. And, on the basis of the color information and the run-length included in this data pair, the image data for the second upper layer 300*b* that is compressed is combined with the combined image data that is stored in the temporary combination result storage means 2304, and this combined image data is stored back into the temporary combination result storage means 2304. Due to this, the combined image data that is now stored in the temporary combination result storage means 2304 becomes a combination of the image data for the lowermost layer 400, the image data for the first upper layer 300*a*, and the image data for the second upper layer 300*b*. And, having completed the processing of the layer combination means 500 in the uncompression combination mode, the CPU 1020 advances the processing of FIG. 26 to a step S1180.

In this step S1160, the CPU 1020 executes the layer combination means 500 in the compression combination mode. The image data for the second upper layer 300*b* is compressed by the compression means 5100, and this compressed image data is stored in the second compressed layer 5500*b*. And, on the basis of the run-length calculated by this compression processing, the image data for the second upper layer 300*b* is combined with the combined image data that is stored in the temporary combination result storage means 2304, and this combined image data is stored back into the temporary combination result storage means 2304. Due to this, the combined image data that is now stored in the temporary combination result storage means 2304 becomes a combination of the image data for the lowermost layer 400, the image data for the first upper layer 300*a*, and the image data for the second upper layer 300*b*. And, having completed the processing of the layer combination means 500 in the compression combination mode, the CPU 1020 advances the processing of FIG. 25 to a step S1170.

In this step S1170, the CPU 1020 resets the second upper layer update flag 5700*b* to "0". And, having reset the second upper layer update flag to "0", the CPU 1020 advances the processing of FIG. 26 to a step S1180.

In the step S1180 of FIG. 26, the CPU 1020 controls the upper layer selection means 2301 to select the third upper layer 300*c*. And, having selected the third upper layer 300*c* with the upper layer selection means 2301, the CPU 1020 advances the processing of FIG. 26 to a step S1190.

In this step S1190, the CPU 1020 controls the lower layer selection means 2302 to select the temporary combination result storage means 2304. And, having selected the temporary combination result storage means 2304 with the lower layer selection means 2302, the CPU 1020 advances the processing of FIG. 26 to a step S1200.

In this step S1200, the CPU 1020 controls the compressed layer selection means 2305 to select the third compressed layer 5500*c*. And, having selected the third compressed layer 5500*c* with the compressed layer selection means 2305, the CPU 1020 advances the processing of FIG. 26 to a step S1210.

In this step S1210, the CPU 1020 controls the output changeover means 2303 to select the frame buffer 600. And, having selected the frame buffer 600 with the output changeover means 2303, the CPU 1020 advances the processing of FIG. 26 to a step S1220.

In this step S1220, the CPU 1020 refers to the third upper layer update flag 5700*c*, and makes a decision as to whether or not this third upper layer update flag 5700*c* is set to "1". If the third upper layer update flag 5700*c* is set to "1", then the CPU 1020 advances the processing of FIG. 26 to a step S1240, whereas if the third upper layer update flag 5700*c* is reset to "0", then the CPU 1020 advances the processing to a step S1230.

In this step S1230, the CPU 1020 executes the layer combination means 500 in the uncompression combination mode. The decompression means 5200 reads in a data pair from the compressed image data for the third upper layer 300*c* that is stored in the third compressed layer 5500*c*. And, on the basis of the color information and the run-length that are included in this data pair, the image data for the third upper layer 300*c* that is compressed is combined with the combined image data that is stored in the temporary combination result storage means 2304, and this combined image data is stored in the frame buffer 600. Due to this, the combined image data that is stored in the frame buffer 600 becomes a combination of the image data for the lowermost layer 400, the image data for the first upper layer 300*a*, the image data for the second upper layer 300*b*, and the image data for the third upper layer 300*c*. And, having completed the processing of the layer combination means 500 in the uncompression combination mode, the CPU 1020 advances the processing of FIG. 26 to a step S1260.

In the step S1240, the CPU 1020 executes the layer combination means 500 in the compression combination mode. The image data for the third upper layer 300*c* is compressed by the compression means 5100, and this compressed image data is stored in the third compressed layer 5500*c*. And, on the basis of the run-length calculated by this compression process, the image data for the third upper layer 300*c* is combined with the combined image data that is stored in the temporary combination result storage means 2304, and this combined image data is stored in the frame buffer 600. Due to this, the combined image data that is stored in the frame buffer 600 becomes a combination of the image data for the lowermost layer 400, the image data for the first upper layer 300*a*, the image data for the second upper layer 300*b*, and the image data for the third upper layer 300*c*. And, having completed the processing of the layer combination means 500 in the compression combination mode, the CPU 1020 advances the processing of FIG. 26 to a step S1250.

In this step S1250, the CPU 1020 resets the third upper layer update flag 5700*c* to "0". And, having reset the third upper layer update flag 5700*c* to "0", the CPU 1020 advances the processing of FIG. 26 to a step S1260.

In this step S1260, the CPU 1020 resets the lower layer update flag 5600 to "0". And, having reset the lower layer update flag 5600 to "0", the CPU 1020 returns the processing to the step S1010 of FIG. 24.

If the number of upper layers to be combined with the lower layer 400 were to be increased, then similar processing to the processing shown in FIG. 25 would be repeated.

And, in the step S1080 of FIG. 24, the step S1160 of FIG. 25, and the step S1240 of FIG. 26, the layer combination means 500 executes similar processing in the compression combination mode to that of the layer combination means 500 in the compression combination mode shown in FIGS. 9 and 10. The pointer RA for reading in the image data for the upper layer 300 in FIGS. 9 and 10 should, in FIGS. 24 through 26, be the read pointer for the image data for the upper layer selected by the upper layer selection means 2301. The pointer RB for reading in the image data for the lower layer 400 should, in FIGS. 24 through 26, be the read pointer for the image data for the lowermost layer 400 or for the temporary combination result storage means 2304, as selected by the lower layer selection means 2302. The pointer WC for writing the combined image data in the frame buffer 600 should, in FIGS. 24 through 26, be the write pointer for the temporary combination result storage means 2304 or the frame buffer 600, as selected by the output changeover means 2303. And the pointer WD for writing the combined image data in the compressed layer 5500 should, in FIGS. 24 through 26, be the write pointer for the compressed layer selected by the compressed layer selection means 2305.

And the layer combination means 500 in the uncompression combination mode executes similar processing in the step S1070 of FIG. 24, the step S1150 of FIG. 25, and the step S1230 of FIG. 26 to that of the layer combination means 500 in the uncompression combination mode shown in FIG. 18. The pointer RD for reading in the compressed image data for the compressed layer 5500 in FIG. 18 should, in FIGS. 24 through 26, be the read pointer for the compressed layer selected by the compressed layer selection means 2305. The pointer RB for reading in the image data for the lower layer 400 should, in FIGS. 24 through 26, be the read pointer for the image data for the lower layer 400 or the temporary combination result storage means 2304 selected by the lower layer selection means 2302. And the pointer WC for writing the combined image data in the frame buffer 600 should, in FIGS. 24 through 26, be the write pointer for the temporary combination result storage means 2304 or the frame buffer 600 selected by the output changeover means 2303.

[2] While, in the embodiment explained above, a navigation device was cited as one example of a display control device, the present invention can also be applied to some device other than a navigation device. For example, it would also be possible to apply the present invention to a screen display of a portable telephone, or the like. On the screen of a portable telephone, there is a display layer upon which images that indicate the state of radio reception and the amount remaining in the battery and so on are drawn by the system program of the portable telephone, and another display layer upon which applications of various types draw during their execution. It would be possible to apply the present invention to combination processing that combines the images upon these display layers.

[3] In the embodiments explained above, it was arranged for the compression means 5100 to be able to identify the end of each row of the image data before compression by adding the end symbol "000" to the compressed image data. However it would also be acceptable, not to use any end symbol "000", but to arrange to perform the compression by a run-length method that straddles across rows. If almost the entire upper layer 300 consists of pixels that are transparent in color, then, in this case, it becomes possible to skip over these pixels that are transparent in color yet more efficiently.

[4] In the embodiments explained above, when the color information for a pixel in the upper layer 300 is not the transparent color, then the color information for this pixel in the upper layer 300 is stored in the frame buffer 600 (in the step S470 of FIG. 17) by the combination calculation means 5300 as the result of combining the image for the upper layer 300 and the image for the lower layer 400. However, the method of combining the images, when the color information for a pixel in the upper layer 300 is not the transparent color, is not to be considered as being limited to this method. For example, it would also be acceptable to arrange to combine the images by performing semi-transparent processing, in which an alpha channel or the like is added to the color information for the pixel in the upper layer 300 and the color information for the pixel in the lower layer 400, this being a per se known technique.

[5] If the image that is drawn in the upper layer 300, in the first upper layer 300a, in the second upper layer 300b, in the third upper layer 300c, or the like is a moving image (i.e. video) or the like, and is frequently updated, then the compressed image data that is stored in the compressed layer 5500 and so on is hardly ever used by the combination calculation means 5300. Thus it would also be acceptable to arrange for storing the compressed image data in the compressed layer 5500 and so on to be prevented, when the image that is displayed in the upper layer 300 or the like is a moving image (video) or the like and when its frequency of updating is higher than some predetermined frame rate. Here, this predetermined frame rate may, for example, be 15 fps (Frames Per Second). A frame rate of 15 fps means that the image is updated fifteen times in each second.

Figure 19:
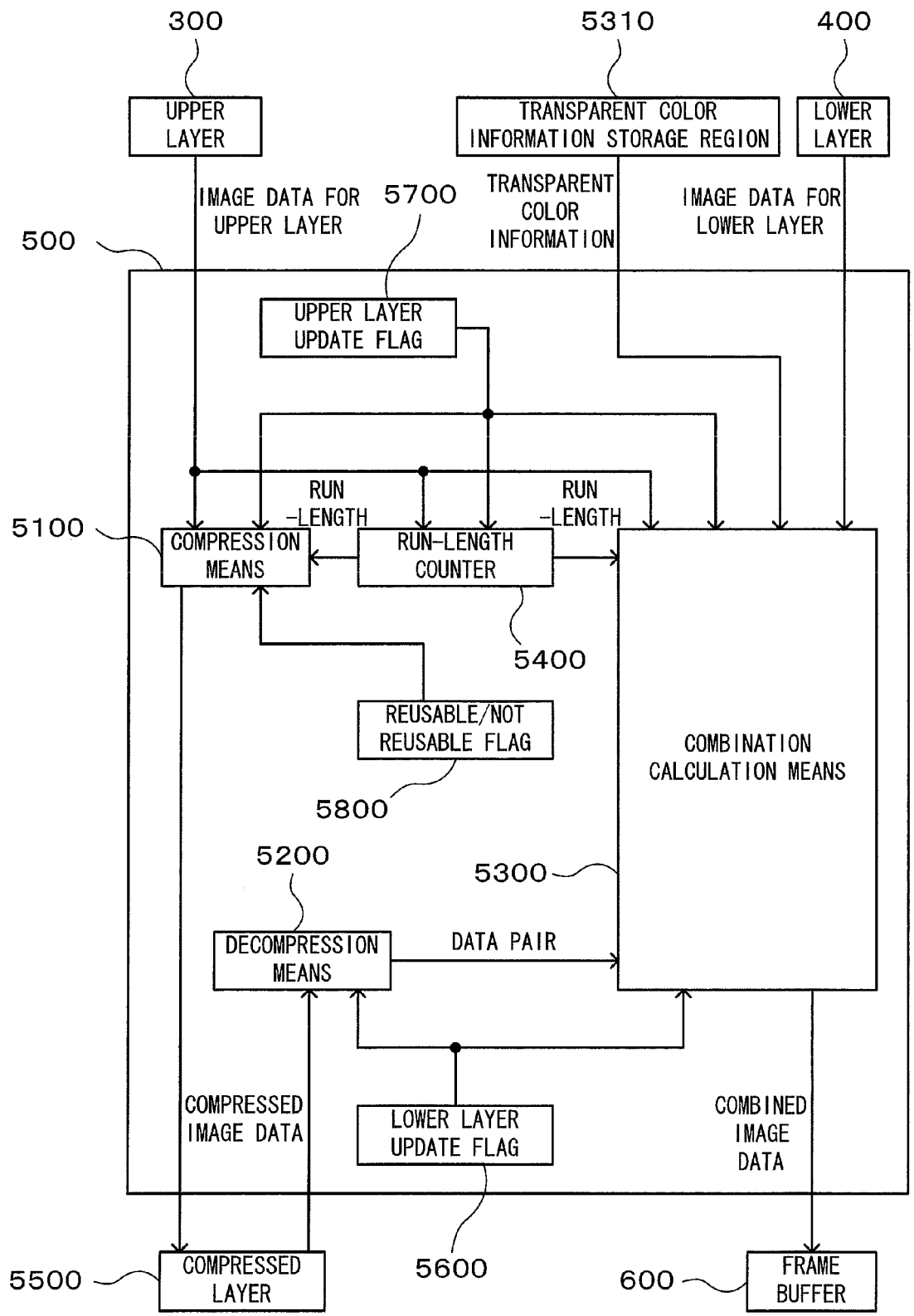
FIG. 19 is a functional block diagram of a layer combination means in a variant embodiment of the present invention.

FIG. 19 shows a case in which, to the functional block diagram of the layer combination means 500 shown in FIG. 5, there is added a structure for implementing write prohibition processing for preventing writing of compressed image data to the compressed layer 5500. In the functional block diagram of FIG. 19, a reusable/not reusable flag 5800 is added to the functional block diagram of FIG. 5. This reusable/not reusable flag 5800 is controlled by the CPU 1020, and is set to "1" when the image data of the upper layer 300 is a moving image (video) or the like, and if it is updated by the upper layer drawing means 100 more frequently than a predetermined frame rate. And, in the layer combination means 500 of the compression combination mode, when this reusable/not reusable flag 5800 is set to "1", writing of the compressed image data to the compressed layer 5500 by the compression means 5100 is prohibited.

This processing of the layer combination means 500 in the compression combination mode to which write prohibition processing has been added will now be explained with reference to the flow charts in FIGS. 20 through 22. These flow charts shown in FIGS. 20 through 22 are the flow charts shown in FIGS. 9 and 10 in relation to the layer combination means 500 in the compression combination mode, with steps related to write prohibition processing based upon the reusable/not reusable flag 5800 added thereto.

Figure 20:
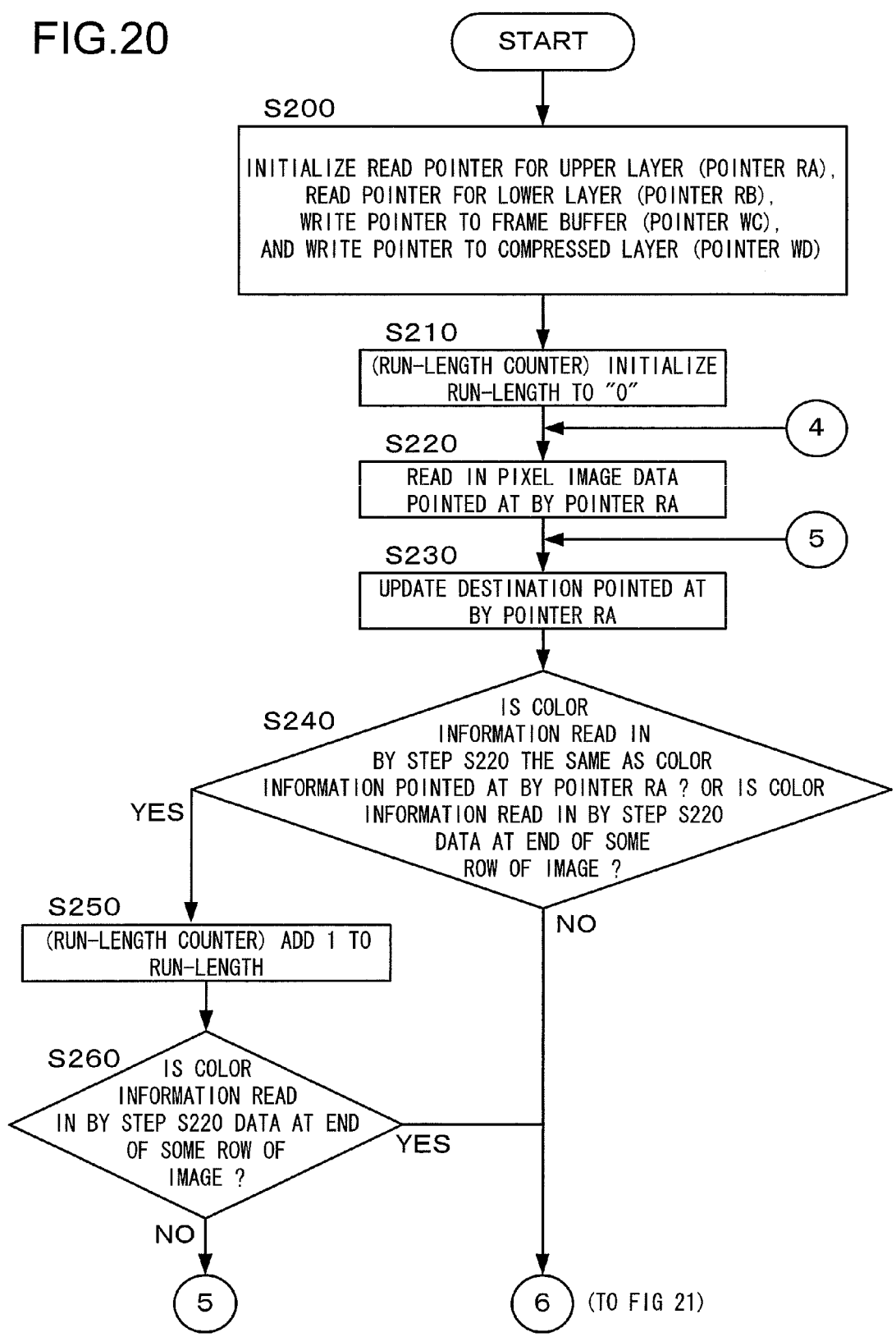
FIG. 20 is an example of a flow chart related to processing by the layer combination means of this variant embodiment of the present invention in a compression combination mode.
Figure 21:
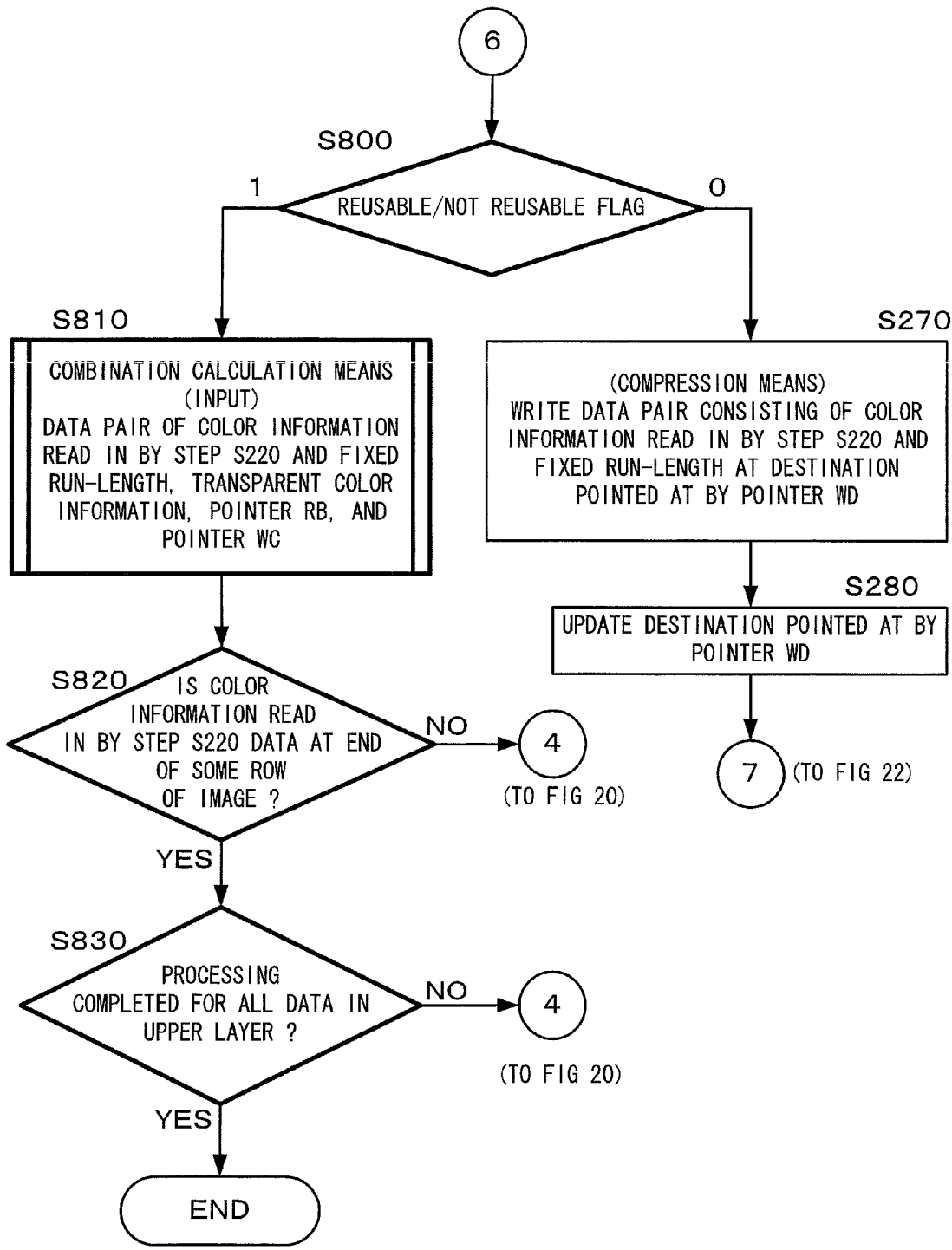
FIG. 21 is an example of a flow chart related to processing by the layer combination means of this variant embodiment of the present invention in the compression combination mode.
Figure 22:
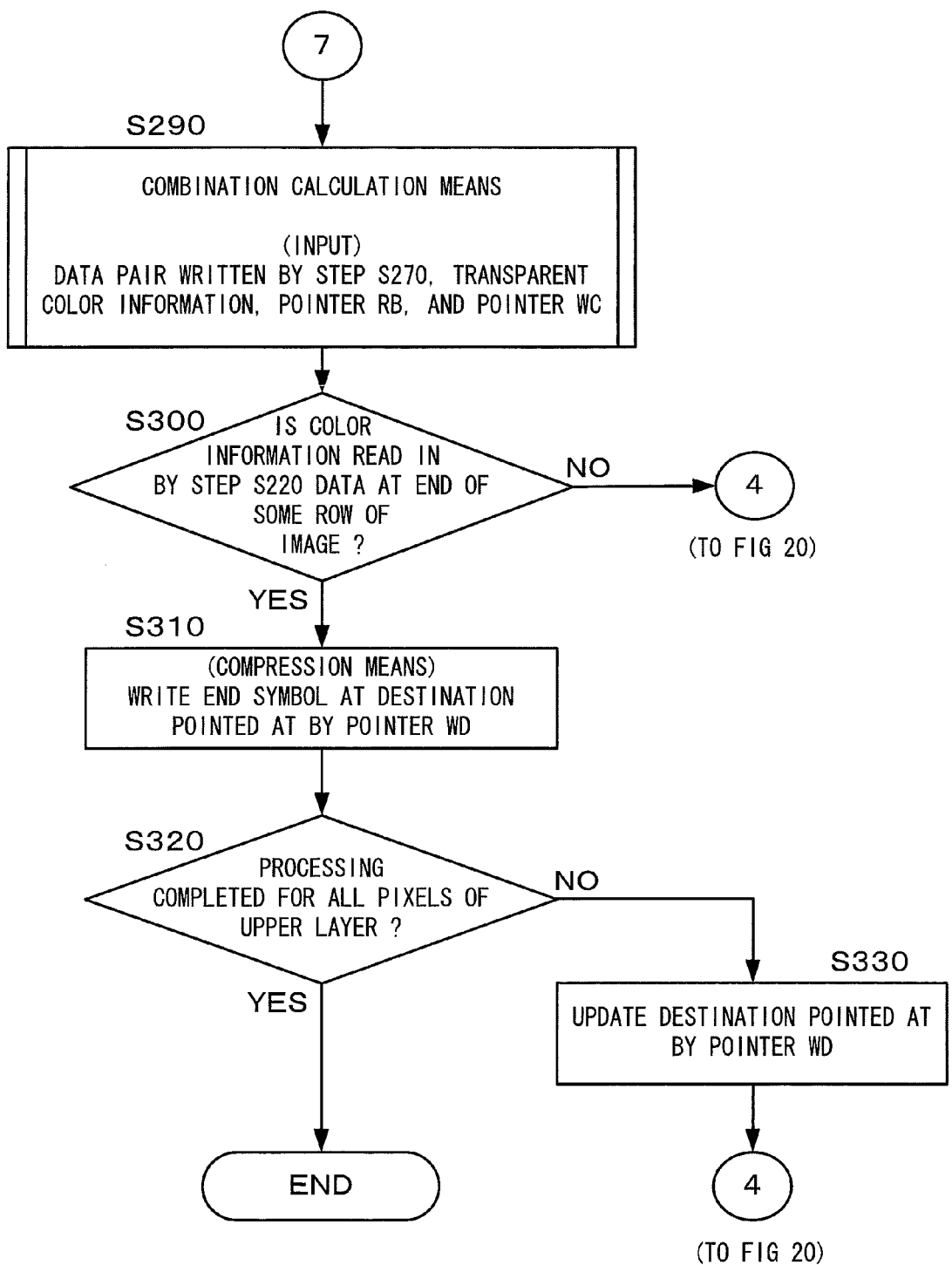
FIG. 22 is a further example of a flow chart related to processing by the layer combination means of this variant embodiment of the present invention in the compression combination mode.

In the flow charts shown in FIGS. 20 through 22, a step S800 is added before the step S270. In the step S800 of FIG. 21, the CPU 1020 makes a decision as to whether or not the reusable/not reusable flag 5800 is set to "1". If in this step S800 of FIG. 21 the reusable/not reusable flag 5800 is set to "1", then the CPU 1020 advances the processing of the layer combination means 500 in the compression combination mode to a step S810, while if the reusable/not reusable flag 5800 is reset to "0", then the CPU 1020 advances the processing of the layer combination means 500 in the compression combination mode to the step S270. When the processing of the layer combination means 500 in the compression combination mode is advanced to the step S270, then the subsequent processing is the same as the processing in FIG. 10.

The processing of the steps S810 through S830 of FIG. 21 is the processing subsequent to the step S270 of the flow chart relating to the layer combination means 500 in the compression combination mode shown in FIGS. 9 and 10, with the step S270, the step S280, the step S310, and the step S330 being omitted.

In the step S810 of FIG. 21, while inputting the data pair consisting of the color information read in by the step S220 and the run-length that has been fixed for this color information, the transparent color information for the upper layer 300 stored in the transparent color information storage region 5310, the pointer RB, and the pointer WC, the CPU 1020 executes the processing of the combination calculation means 5300. By executing the combination calculation means 5300, the CPU 1020 writes combined image data for a total number of pixels from the position at which the pointer WC points, equal to the run-length value included in the data pair. And, when the execution of the combination calculation means 5300 in this step S810 of FIG. 21 has been completed, the CPU advances the flow of control to a step S820.

In the step S820 of FIG. 21, the CPU 1020 makes a decision as to whether or not the condition #2 (described above in the explanation of FIG. 9) holds. If the CPU 1020 decides that the condition #2 holds, then it advances the processing of the layer combination means 500 in the compression combination mode to a step S830, whereas, if the CPU 1020 decides that the condition #2 does not hold, then it returns the processing to the step S220 of FIG. 20.

In the step S830 of FIG. 21, the CPU 1020 makes a decision as to whether or not the processing of the layer combination means 500 in the compression combination mode has been completed for all of the data included in the image data for the upper layer 300. This decision may, for example, be made by determining whether or not the pointer RA is pointing at "null". If an affirmative decision is reached, then the CPU 1020 terminates the processing of the layer combination means 500 in the compression combination mode, whereas if a negative decision is reached, then the CPU 1020 returns the processing of the layer combination means 500 in the compression combination mode to the step S220 of FIG. 20.

The embodiment and variant embodiments described above are only given by way of example; the present invention is not to be considered as being limited by the details thereof, provided that the gist of the present invention is not departed from.

What is claimed is:

1. A display control device that displays, upon a display device, combined image data obtained by combining image data for a plurality of display layers, each of the plurality of display layers consisting of a plurality of pixels, the image data of each of the plurality of display layers including color information relating to the colors of the plurality of pixels included in the display layer, comprising:

a transparent color information storage unit that stores transparent color information specifying color information for a transparent color in the image data for each of the plurality of display layers, except for the lowermost display layer;

a run-length counter that calculates a run-length specifying, for the color information included in the image data for each of the plurality of display layers except for the lowermost display layer, the number of consecutive pixels having the same color information;

a compression unit that generates compressed image data based upon the run-length calculated by the run-length counter;

a combination calculation unit that combines the image data for the plurality of display layers to generate the combined image data by using the run-length;

a combined image display unit that outputs the combined image data generated by the combination calculation unit to the display device to display the combined image upon the display device, wherein if, for some display layer among the plurality of display layers other than the lowermost layer, the color information for a total of run-length pixels calculated by the run-length counter is a transparent color, the combination calculation unit performs combination by ignoring the image data for the total number run-length of consecutive pixels;

an upper layer update decision unit that, for each of one or more upper layers among the plurality of display layers other than the lowermost display layer, decides whether or not the image data for that upper layer has been updated;

a lower layer update decision unit that decides whether or not the image data for the lowermost layer among the plurality of display layers has been updated;

wherein the compression unit generates compressed image data based upon the color information and upon the run-length of that color information calculated by the run-length counter, included in the image data for each of the one or more upper layers, and stores the compressed image data in one or more compressed layers each corresponding to the one or more upper layers; and a decompression unit that reads out, from the compressed image data stored in each of the compressed layers, the color information and the run-length of that color information, wherein the combination calculation unit:

generates the combined image data by successively combining the image data for the one or more upper layers with the image data for the lowermost layer, in increasing hierarchical order from the upper layer of lowest order;

for each upper layer, among the one or more upper layers, for which it has been decided by the upper layer update decision unit that the image data has been updated, combines the image data for that upper layer with the image data for the lowermost layer on the basis of the run-length calculated by the run-length counter when the compression unit generates the compressed image data for the image data; and for each upper layer, among the one or more upper layers, for which it has not been decided by the upper layer update decision unit that the image data has been updated, when it has been decided that the image data of the lowermost layer has been updated, combines the image data for that upper layer with the image data for the lowermost layer on the basis of the color information and the run-length read out by the decompression unit from the compressed image data stored in correspondence to that upper layer.

2. A display control device that displays, upon a display device, combined image data obtained by combining image data for a plurality of display layers, each of the plurality of display layers consisting of a plurality of pixels, the image data of each of the plurality of display layers including color information relating to the colors of the plurality of pixels included in the display layer, comprising:

a transparent color information storage unit that stores transparent color information specifying color information for a transparent color in the image data for each of the plurality of display layers, except for the lowermost display layer;

a run-length counter that calculates a run-length specifying, for the color information included in the image data for each of the plurality of display layers except for the lowermost display layer, the number of consecutive pixels having the same color information;

a compression unit that generates compressed image data based upon the run-length calculated by the run-length counter;

a combination calculation unit that combines the image data for the plurality of display layers to generate the combined image data by using the run-length;

a combined image display unit that outputs the combined image data generated by the combination calculation unit to the display device to display the combined image upon the display device, wherein if, for some display layer among the plurality of display layers other than the lowermost layer, the color information for a total of run-length pixels calculated by the run-length counter is a transparent color, the combination calculation unit performs combination by ignoring the image data for the total number run-length of consecutive pixels;

an upper layer update decision unit that, for each of one or more upper layers among the plurality of display layers other than the lowermost display layer, decides whether or not the image data for that upper layer has been updated;

a lower layer update decision unit that decides whether or not the image data for the lowermost layer among the plurality of display layers has been updated;

wherein the compression unit generates compressed image data based upon the color information and upon the run-length of that color information calculated by the run-length counter, included in the image data for each of the one or more upper layers, and stores the compressed image data in one or more compressed layers each corresponding to the one or more upper layers;

a decompression unit that reads out, from the compressed image data stored in each of the compressed layers, the color information and the run-length of that color information, wherein the combination calculation unit:

generates the combined image data by successively combining the image data for the one or more upper layers with the image data for the lowermost layer, in increasing hierarchical order from the upper layer of lowest order;

for each upper layer, among the one or more upper layers, for which it has been decided by the upper layer update decision unit that the image data has been updated, combines the image data for that upper layer with the image data for the lowermost layer on the basis of the run-length calculated by the run-length counter when the compression unit generates the compressed image data for the image data; and for each upper layer, among the one or more upper layers, for which it has not been decided by the upper layer update decision unit that the image data has been updated, when it has been decided that the image data of the lowermost layer has been updated, combines the image data for that upper layer with the image data for the lowermost layer on the basis of the color information and the run-length read out by the decompression unit from the compressed image data stored in correspondence to that upper layer; and an image update frequency decision unit that makes a decision as to whether or not the image data for each of the one or more upper layers is being updated more frequently than a predetermined frame rate, wherein when it has been decided by the image update frequency decision unit that the image data for any of the one or more upper layers is being updated more frequently than the predetermined frame rate, and moreover when the image data for that upper layer has been updated, the combination calculation unit prohibits the compression unit from storing the compressed image data in the compressed layer corresponding to that upper layer.

3. A display layer combination program for causing a CPU to combine image data for a plurality of display layers stored in a memory, wherein:

each of the plurality of display layers consists of a plurality of pixels;

the image data for each of the plurality of display layers includes color information relating to the colors of the plurality of pixels included in that display layer;

transparent color information specifying color information for a transparent color in the image data for each of the plurality of display layers, except for the lowermost display layer, is stored in the memory;

the program causes the CPU to function as:

a run-length calculation unit that calculates a run-length specifying, for the color information included in the image data for each of the plurality of display layers except for the lowermost display layer, the number of consecutive pixels having the same color information;

a compression unit that generates compressed image data based upon the run-length calculated by the run-length calculation unit; and a combination calculation unit that combines the image data for the plurality of display layers by units of pixels to generate the combined image data by using the run-length; and if, for some display layer among the plurality of display layers other than the lowermost layer, the color information for a total of run-length pixels calculated by the run-length counter is a transparent color, the combination calculation unit performs combination by ignoring the image data for the total number run-length of consecutive pixels, wherein:

the program further causes the CPU to function as:

an upper layer update decision unit that, for each of the one or more upper layers among the plurality of display layers other than the lowermost display layer, decides whether or not the image data for that upper layer has been updated;

a lower layer update decision unit that decides whether or not the image data for the lowermost layer among the plurality of display layers has been updated;

wherein the compression unit generates compressed image data based upon color information and the run-length of that color information calculated by the run-length counter, included in the image data for each of the one or more upper layers, and stores the compressed image data in one or more compressed layers each corresponding to the one or more upper layers; and a decompression unit that reads out, from the compressed image data stored in each of the compressed layers, the color information and the run-length of that color information; and the combination calculation unit:

generates the combined image data by successively combining the image data for the one or more upper layers with the image data for the lowermost layer, in increasing hierarchical order from the upper layer of lowest order;

for each upper layer, among the one or more upper layers, for which it has been decided by the upper layer update decision unit that the image data has been updated, combines the image data for that upper layer with the image data for the lowermost layer on the basis of the run-length calculated by the run-length counter when the compression unit generates the compressed image data for the image data; and for each upper layer, among the one or more upper layers, for which it has not been decided by the upper layer update decision unit that the image data has been updated, when it has been decided that the image data of the lowermost layer has been updated, combines the image data for that upper layer with the image data for the lowermost layer on the basis of the color information and the run-length read out by the decompression unit from the compressed image data stored in correspondence to that upper layer.

* * * * *